United States Patent
Mizoguchi

(10) Patent No.: US 12,466,063 B2
(45) Date of Patent: Nov. 11, 2025

(54) ROBOTIC SYSTEM WITH GRIPPING MECHANISMS, AND RELATED SYSTEMS AND METHODS

(71) Applicant: MUJIN, Inc., Tokyo (JP)

(72) Inventor: Hironori Mizoguchi, Tokyo (JP)

(73) Assignee: MUJIN, Inc., Tokyo (JP)

( * ) Notice: Subject to any disclaimer, the term of this patent is extended or adjusted under 35 U.S.C. 154(b) by 280 days.

(21) Appl. No.: 18/177,040

(22) Filed: Mar. 1, 2023

(65) Prior Publication Data

US 2023/0278208 A1    Sep. 7, 2023

Related U.S. Application Data

(60) Provisional application No. 63/315,947, filed on Mar. 2, 2022.

(51) Int. Cl.
  *B25J 9/16*   (2006.01)
  *B25J 13/08*  (2006.01)
  *B25J 15/00*  (2006.01)
  *B25J 15/06*  (2006.01)

(52) U.S. Cl.
  CPC .......... *B25J 9/1661* (2013.01); *B25J 9/1653* (2013.01); *B25J 9/1666* (2013.01); *B25J 13/082* (2013.01); *B25J 15/0028* (2013.01); *B25J 15/0616* (2013.01)

(58) Field of Classification Search
  CPC .. B25J 13/082; B25J 15/0028; B25J 15/0253; B25J 15/0616; B25J 9/1612; B25J 9/1653; B25J 9/1661; B25J 9/1666; B25J 9/1687; G05B 2219/39024; G05B 2219/39557; G05B 2219/39558
  See application file for complete search history.

(56) References Cited

U.S. PATENT DOCUMENTS

| | | | |
|---|---|---|---|
| 2020/0198157 A1* | 6/2020 | Hirata | B25J 15/086 |
| 2020/0316787 A1* | 10/2020 | Fujihara | B25J 15/0014 |
| 2023/0249366 A1* | 8/2023 | Hairsnape | B25J 9/126 700/254 |

* cited by examiner

*Primary Examiner* — Khoi H Tran
*Assistant Examiner* — Alyse Tramanh Tran
(74) *Attorney, Agent, or Firm* — Dorsey & Whitney LLP

(57) ABSTRACT

Robotic systems with griping mechanisms, and related systems and methods are disclosed herein. In some embodiments, the robotic system includes a robotic arm and an end-of-arm tool coupled to the robotic arm. The end-of-arm tool can include a housing, a vacuum-gripping component, and a clamping component. The vacuum-gripping component can be operably coupled to a lower surface of the housing to apply a suction force to an upper surface of a target object. The clamping component can include first and second clamping elements. The first clamping element projects at least partially beneath the lower surface of the housing and is movable along a lateral axis to engage a first side surface of the target object. Similarly, the second clamping element projects at least partially beneath the lower surface of the frame and is movable along the lateral axis to engage with a second side surface of the target object.

18 Claims, 10 Drawing Sheets

ROBOTIC SYSTEM WITH GRIPPING MECHANISMS, AND RELATED SYSTEMS AND METHODS

CROSS-REFERENCE TO RELATED APPLICATION(S)

The present application claims the benefit of U.S. Provisional Patent Application No. 63/315,947, filed Mar. 2, 2022, the entirety of which is incorporated herein by reference.

TECHNICAL FIELD

The present technology is related generally to robotic systems with gripping mechanisms, and more specifically robotic systems with features for identifying a target object and adjusting the gripper mechanisms based on the target object.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations of and/or interactions between robots.

Figure 1:
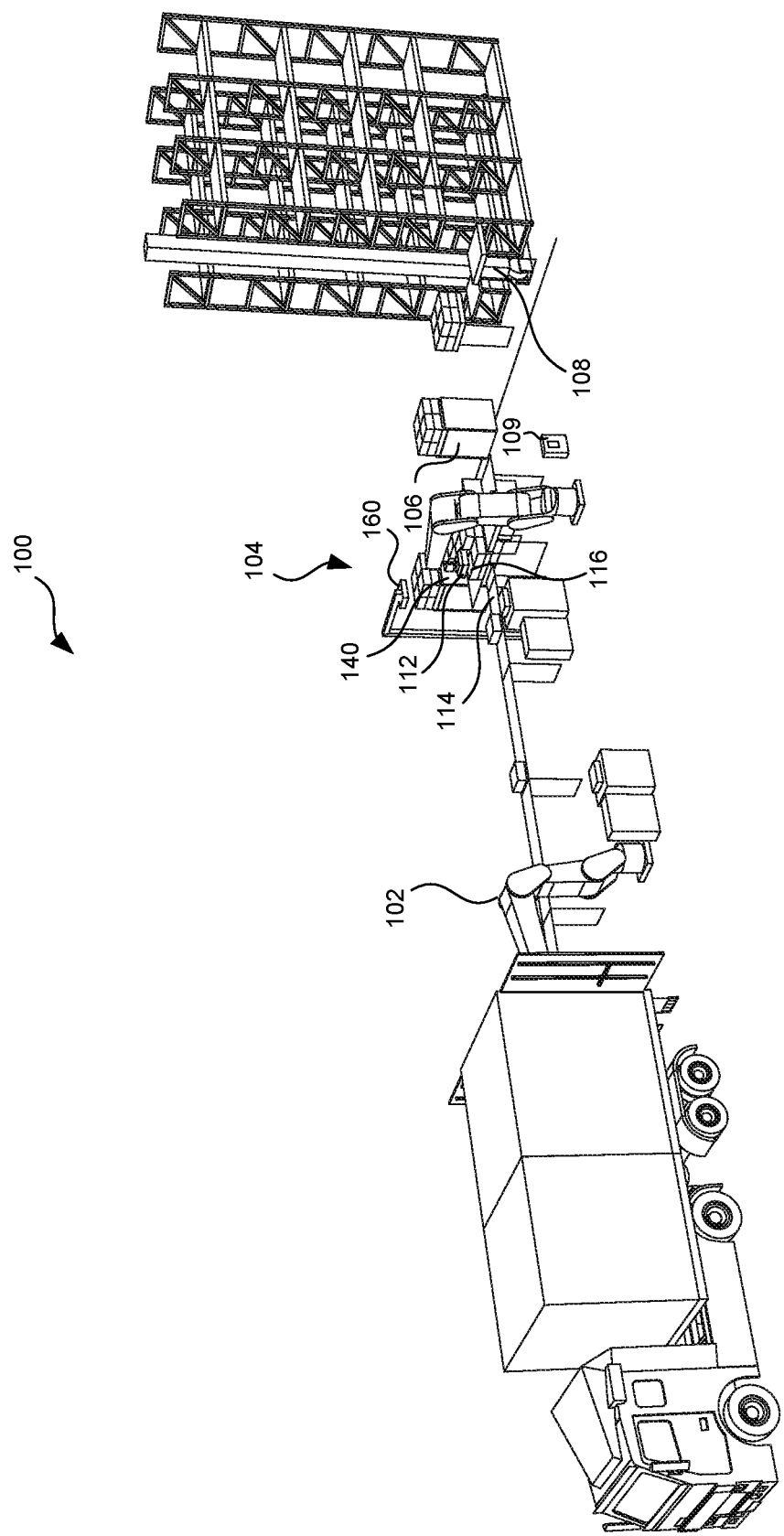
FIG. 1 is an illustration of an example environment in which a robotic system with a gripping mechanism can operate in accordance with some embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

For ease of reference, the end-of-arm tool and the components thereof are sometimes described herein with reference to top and bottom, upper and lower, upwards and downwards, a longitudinal plane, a horizontal plane, an x-y plane, a vertical plane, and/or a z-plane relative to the spatial orientation of the embodiments shown in the figures. It is to be understood, however, that the end-of-arm tool, and the components thereof, can be moved to, and used in, different spatial orientations without changing the structure and/or function of the disclosed embodiments of the present technology.

DETAILED DESCRIPTION

Overview

Robotic systems with hybrid gripping mechanisms and related systems and methods are disclosed herein. In some embodiments, the robotic system includes a robotic arm and an end-of-arm tool coupled to the robotic arm. The end-of-arm tool can include a housing, as well as a vacuum-gripping component and a clamping component operably coupled to the housing. For example, the vacuum-gripping component can be operably coupled to a lower surface of the housing to engage an upper surface of a target object (e.g., via a suction force). The suction force, however, can be insufficient to move the target object with a requisite stability (e.g., to fully grip the target object and/or allow the end-of-arm tool to move the target object at relatively high speeds). The clamping component can help supplement the strength of the grip. To do so, the clamping component can include first and second clamping elements that are positioned (or project) at least partially beneath the lower surface of the housing and are movable along a lateral axis to engage (e.g., clamp on) side surfaces of the target object.

In some embodiments, the clamping component also includes an actuator system that is operably coupled between the housing and the first and second clamping elements. The actuator system can control the movement of the first and second clamping elements along the lateral axis. Purely by way of example, the actuator system can include first and second extendible arms coupled to the first and second clamping elements, respectively, and one or more drivers that control the extension of the extendible arms. Additionally, the end-of-arm tool can include one or more sensors operably coupled to the actuator system and a controller operably coupled to the sensor and the actuator system.

The sensor(s) measure a force between the first and/or second clamping elements and the side surfaces of the target object. For example, the sensor(s) can include a current sensor coupled to an input line for the actuator system to measure the current consumed by the actuator system, a force sensor positioned to measure resistance to the movement of the first and second clamping elements, and/or any other suitable sensors.

The controller can store instructions that, when executed by the controller, cause the controller to receive one or more signals from the sensor related to the force and stop the movement of the first and second clamping elements, via the actuator system, when a magnitude of the force exceeds a threshold value. In some embodiments, the threshold value is a predetermined value configured to avoid damage to the target object from the first and second clamping elements. In some embodiments, the threshold value varies between different target objects.

In some embodiments, the vacuum-gripping component includes first and second vacuum elements that are each operably coupled to the lower surface. Further, the second vacuum element can be spaced apart from the first vacuum element to define a gap therebetween. In such embodiments, the first and second clamping elements can be operatively coupled to the housing through the gap defined by the first and second vacuum elements.

In various embodiments, the first clamping element is movable along the lateral axis independent from the second clamping element, the second clamping element is movable along the lateral axis independent from the first clamping element the first and second clamping elements move in conjunction, and/or only one of the first and second clamping elements moves along the lateral axis.

Several details describing structures or processes that are well known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Example Environment for Robotic System

FIG. 1 is an illustration of an example environment in which a robotic system 100 with an object handling mechanism can operate. The operating environment for the robotic system 100 can include one or more structures, such as robots or robotic devices, configured to execute one or more tasks. Aspects of the object handling mechanism can be practiced or implemented by the various structures and/or components.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotics system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves.

In some embodiments, the robotic system 100 can include a unit (e.g., the transfer unit) configured to perform different tasks that involve different target objects. For example, the robotic system 100 can include the transfer unit 104 that is configured (via, e.g., a multi-purpose end-effector) to manipulate packages, package container (e.g., pallets or bins), and/or support objects (e.g., slip sheets). The transfer unit 104 may be located at a station that has the different target objects arranged around the transfer unit 104. The robotic system 100 can use the multi-purpose configuration to sequence and implement the different tasks to achieve a complex operation. Additionally, or alternatively, the station can be used accommodate or implement different types of tasks (e.g., packing/unpacking objects from a shipping unit, stacking or grouping pallets/slip sheets, and the like) according to real-time requirements or conditions of the overall system 100. Details regarding the tasks and the multi-purpose configuration are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The robotic system 100 can include a controller 109 configured to interface with and/or control one or more of the robotic units. For example, the controller 109 can include circuits (e.g., one or more processors, memory, etc.) configured to derive motion plans and/or corresponding commands, settings, and the like used to operate the corresponding robotic unit. The controller 109 can communicate the motion plans, the commands, settings, etc. to the robotic unit, and the robotic unit can execute the communicated plan to accomplish a corresponding task, such as to transfer the target object 112 from the object source 114 to the task location 116. Additionally, the robotic system can be coupled to environmental sensors 140 and/or an imaging system 160 to record an environment around the robotic system 100 and/or take one or more measurements of the target object 112 to assist the controller 109 in deriving the motion plans.

Suitable System

Figure 2:
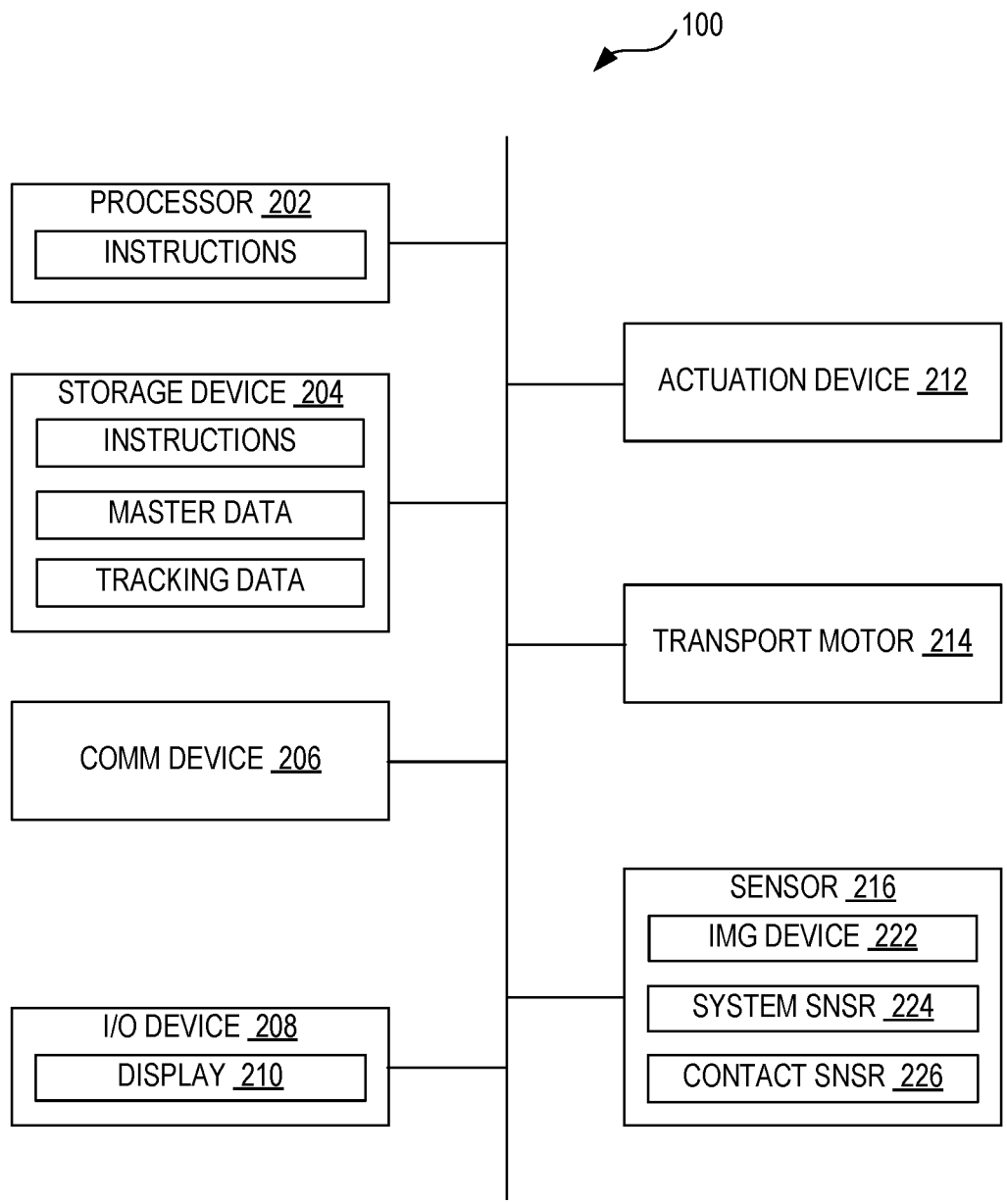
FIG. 2 is a block diagram illustrating the robotic system of FIG. 1 in accordance with some embodiments of the present technology.

FIG. 2 is a block diagram illustrating the robotic system 100 in accordance with one or more embodiments of the present technology. In some embodiments, for example, the robotic system 100 can include electronic devices, electrical devices, or a combination thereof, such as a control unit 202 (sometimes also referred to herein as a "processor"), a storage unit 204, a communication unit 206, a system input/output (I/O) device 208 having a system interface 210 (sometimes also referred to herein as a "user interface 210"), one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof. The control unit 202 can execute software and/or instructions to provide the intelligence of the robotic system 100.

The control unit 202 can be operably coupled to the user interface 210 to provide a user with control over the control unit 202. The user interface 210 can be used for communication between the control unit 202 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

The user interface 210 can be implemented in different ways and can include different implementations depending on which functional units or external units are being interfaced with the user interface 210. For example, the user interface 210 can be implemented with a pressure sensor, an inertial sensor, a microelectromechanical system (MEMS), optical circuitry, waveguides, wireless circuitry, wireline circuitry, application programming interface, or a combination thereof.

The storage unit 204 can store the software instructions, master data, tracking data or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, or off-line storage.

The storage unit 204 can be a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). As a further example, storage unit 204 can be a non-transitory computer medium including the non-volatile memory, such as a hard disk drive, NVRAM, solid-state storage device (SSD), compact disk (CD), digital video disk (DVD), or universal serial bus (USB) flash memory devices. The software can be stored on the non-transitory computer readable medium to be executed by a control unit 202.

The storage unit 204 can be operably coupled to the user interface 210. The user interface 210 can be used for communication between the storage unit 204 and other functional units in the robotic system 100. The user interface 210 can also be used for communication that is external to the robotic system 100. The user interface 210 can receive information from the other functional units or from external sources, or can transmit information to the other functional units or to external destinations. The external sources and the external destinations refer to sources and destinations external to the robotic system 100.

Similar to the discussion above, the user interface 210 can include different implementations depending on which functional units or external units are being interfaced with the storage unit 204. The user interface 210 can be implemented with technologies and techniques similar to the implementation of the user interface 210 discussed above.

In some embodiments, the storage unit 204 is used to further store and provide access to processing results, predetermined data, thresholds, or a combination thereof. For example, the storage unit 204 can store the master data that includes descriptions of the one or more target objects 112 (e.g., boxes, box types, cases, case types, products, and/or a combination thereof). In one embodiment, the master data includes dimensions, predetermined shapes, templates for potential poses and/or computer-generated models for recognizing different poses, a color scheme, an image, identification information (e.g., bar codes, quick response (QR) codes, logos, and the like), expected locations, an expected weight, and/or a combination thereof, for the one or more target objects 112 expected to be manipulated by the robotic system 100.

In some embodiments, the master data includes manipulation-related information regarding the one or more objects that can be encountered or handled by the robotic system 100. For example, the manipulation-related information for the objects can include a center-of-mass location on each of the objects, expected sensor measurements (e.g., for force, torque, pressure, and/or contact measurements), corresponding to one or more actions, maneuvers, or a combination thereof.

The communication unit 206 can enable external communication to and from the robotic system 100. For example, the communication unit 206 can enable the robotic system 100 to communicate with other robotic systems or units, external devices, such as an external computer, an external database, an external machine, an external peripheral device, or a combination thereof, through a communication path 218, such as a wired or wireless network.

The communication path 218 can span and represent a variety of networks and network topologies. For example, the communication path 218 can include wireless communication, wired communication, optical communication, ultrasonic communication, or the combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 218. Cable, Ethernet, digital subscriber line (DSL), fiber optic lines, fiber to the home (FTTH), and plain old telephone service (POTS) are examples of wired communication that can be included in the communication path 218. Further, the communication path 218 can traverse a number of network topologies and distances. For example, the communication path 218 can include direct connection, personal area network (PAN), local area network (LAN), metropolitan area network (MAN), wide area network (WAN), or a combination thereof. The robotic system 100 can transmit information between the various units through the communication path 218. For example, the information can be transmitted between the control unit 202, the storage unit 204, the communication unit 206, the I/O device 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units or from external sources, or can transmit information to the other functional units or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The I/O device 208 can include one or more input sub-devices and/or one or more output sub-devices. Examples of the input devices of the I/O device 208 can include a keypad, a touchpad, soft-keys, a keyboard, a microphone, sensors for receiving remote signals, a camera for receiving motion commands, or any combination thereof to provide data and communication inputs. Examples of the output device can include a display interface. The display interface can be any graphical user interface such as a display, a projector, a video screen, and/or any combination thereof.

The control unit 202 can operate the I/O device 208 to present or receive information generated by the robotic system 100. The control unit 202 can operate the I/O device 208 to present information generated by the robotic system 100. The control unit 202 can also execute the software and/or instructions for the other functions of the robotic system 100. The control unit 202 can further execute the software and/or instructions for interaction with the communication path 218 via the communication unit 206.

The robotic system 100 can include physical or structural members, such as robotic manipulator arms, that are connected at joints for motion, such as rotational displacement, translational displacements, or a combination thereof. The structural members and the joints can form a kinetic chain configured to manipulate an end-effector, such as a gripping element, to execute one or more task, such as gripping, spinning, or welding, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect or measure one or more physical properties of the robotic system 100, such as a state, a condition, a location of one or more structural members or joints, information about objects or surrounding environment, or a combination thereof. As an example, the sensor units 216 can include imaging devices, system sensors, contact sensors, and/or any combination thereof.

In some embodiments, the sensor units 216 include one or more imaging devices 222. The imaging devices 222 are devices configured to detect and image the surrounding environment. For example, the imaging devices 222 can include 2-dimensional cameras, 3-dimensional cameras, both of which can include a combination of visual and infrared capabilities, lidars, radars, other distance-measuring devices, and other imaging devices. The imaging devices 222 can generate a representation of the detected environment, such as a digital image or a point cloud, used for implementing machine/computer vision for automatic inspection, robot guidance, or other robotic applications. As described in further detail below, the robotic system 100 can process the digital image, the point cloud, or a combination thereof via the control unit 202 to identify the target object 112 of FIG. 1, a pose of the target object 112 of, or a combination thereof. For manipulating the target object 112, the robotic system 100 can capture and analyze an image of a designated area, such as inside the truck, inside the container, or a pickup location for objects on the conveyor belt, to identify the target object 112 and the object source 114 of FIG. 1 thereof. Similarly, the robotic system 100 can capture and analyze an image of another designated area, such as a drop location for placing objects on the conveyor belt, a location for placing objects inside the container, or a location on the pallet for stacking purposes, to identify the task location 116 of FIG. 1.

In some embodiments, the sensor units 216 can include system sensors 224. The system sensors 224 can monitor the robotic units within the robotic system 100. For example, the system sensors 224 can include units or devices to detect and monitor positions of structural members, such as the robotic arms and the end-effectors, corresponding joints of robotic units, resistance to movement of components of the end-effectors, and/or a combination thereof. In a specific example, the system sensors 224 can include capacitance sensors, force sensors, toque sensors, and/or the like that measure resistance to movement of clamping mechanisms in the end-effectors. As a further example, the robotic system 100 can use the system sensors 224 to track locations, orientations, or a combination thereof of the structural members and the joints during execution of the task. Examples of the system sensors 224 can include accelerometers, gyroscopes, or position encoders.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, other tactile sensors, and/or any other suitable sensors configured to measure a characteristic associated with a direct contact between multiple physical structures or surfaces. For example, the contact sensors 226 can measure the characteristic that corresponds to a grip of the end-effector on the target object 112 (e.g., grip of one or more clamping mechanisms on sides of the target object 112) or measure the weight of the target object 112. Accordingly, the contact sensors 226 can output a contact measure that represents a quantified measure, such as a measured force or torque, corresponding to a degree of contact or attachment between the gripping element and the target object 112. For example, the contact measure can include one or more force or torque readings associated with forces applied to the target object 112 by the end-effector.

Suitable Robotic Object-Gripping Systems

Figure 3:
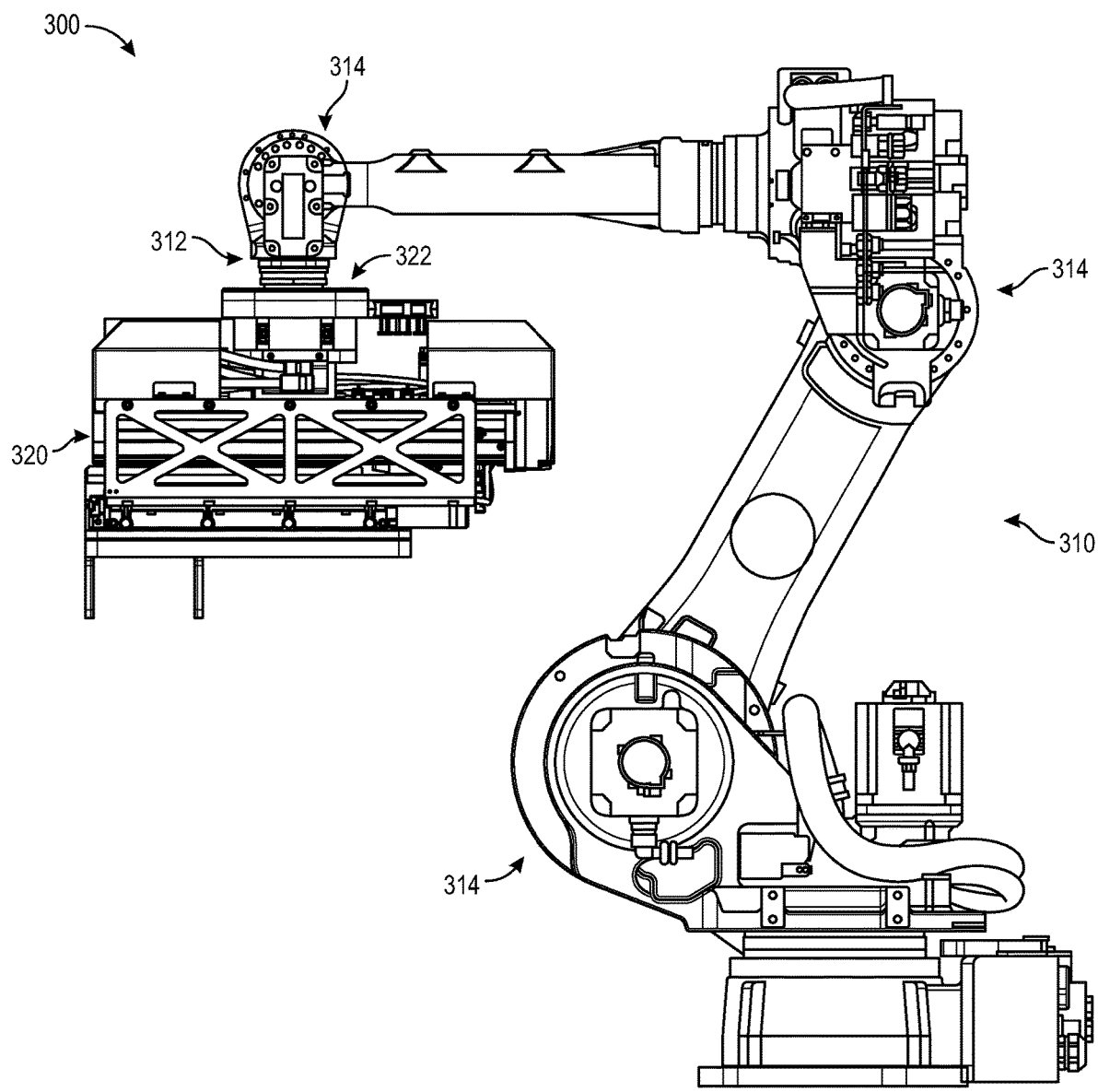
FIG. 3 is an illustration of a robotic unit configured in accordance with some embodiments of the present technology.

FIG. 3 is an illustration of a robotic unit 300 (e.g., one of the robotic units, such as a palletizer unit, a devanning unit, a picker unit, etc., described above for FIG. 1) configured in accordance with some embodiments of the present technology. In the illustrated embodiment, the robotic unit 300 includes a robotic arm 310 and an end-of-arm tool 320 (sometimes also referred to herein as an "end effector," an "object-gripping assembly," a "gripping assembly," a "grasping mechanism," an "object gripper," a "gripper," and/or a "gripping head") carried by the robotic arm 310. As illustrated in FIG. 3, the robotic arm 310 can include a first flange 312 and one or more joints 314 (three shown), while the end-of-arm tool 320 includes a second flange 322 operably couplable to the first flange 312 of the robotic arm 310. When joined together, the first and second flanges 312, 322 can establish both a physical connection and one or more communicative connections (e.g., electrical connections, fluid connections, or other suitable communicative connections). The physical connections allow the robotic arm 310 to carry the end-of-arm tool 320 while the communicative connections allow the end-of-arm tool 320 to be controlled through a connection to the robotic arm 310.

The robotic unit 300 can be configured to pick up, grip, transport, release, load, and/or unload various types or categories of objects. For example, in the illustrated embodiment, the one or more joints 314 allow the robotic arm 310 to controllably position the end-of-arm tool 320 over and/or adjacent to a target object (e.g., the target object 112 discussed above with respect to FIG. 1). Once positioned, the end-of-arm tool 320 can be operated to grip the target object. The one or more joints 314 also then the robotic arm 310 to controllably position the end-of-arm tool 320 to move the target object between locations (e.g., between a pick-up location and a drop-off location). Once the end-of-arm tool 320 is positioned over a desired location, the end-of-arm tool 320 can be operated to release the target object. Additional details on the operation of the end-of-arm tool 320 are provided below with respect to FIGS. 4A-7.

Figure 4A:
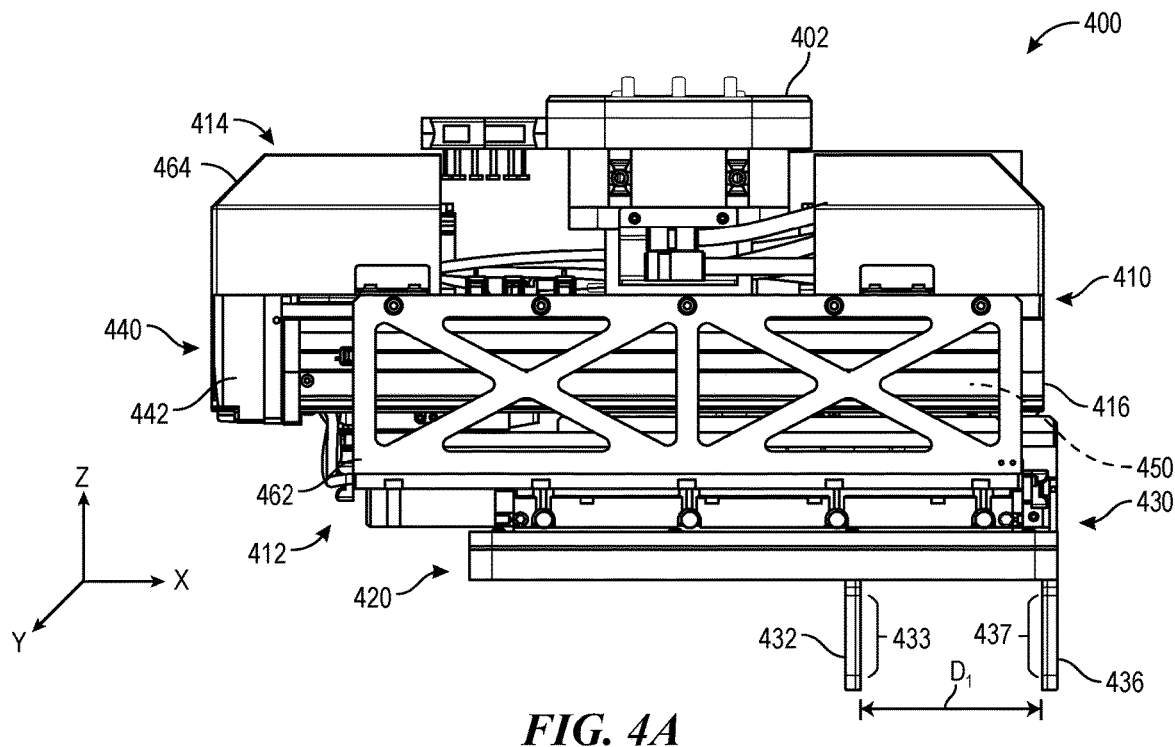
FIGS. 4A-4D are partially schematic views of an end-of-arm tool in accordance with some embodiments of the present technology.
Figure 4B:
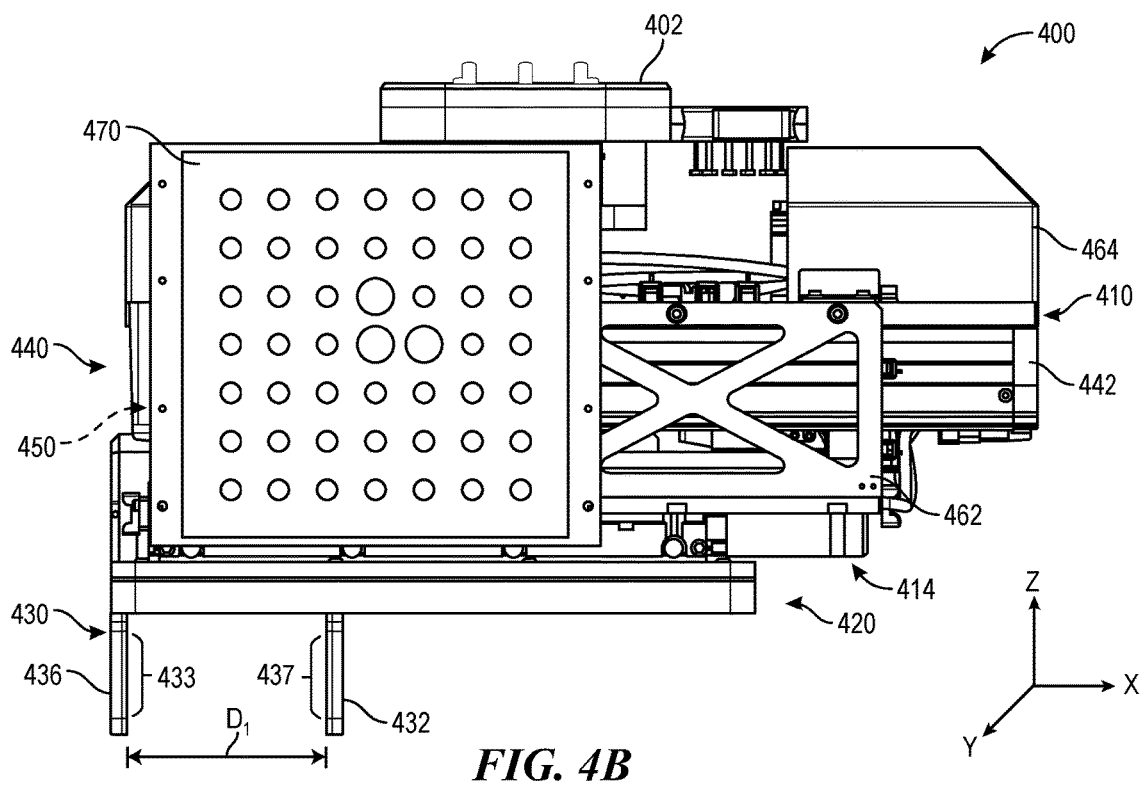
Figure 4C:
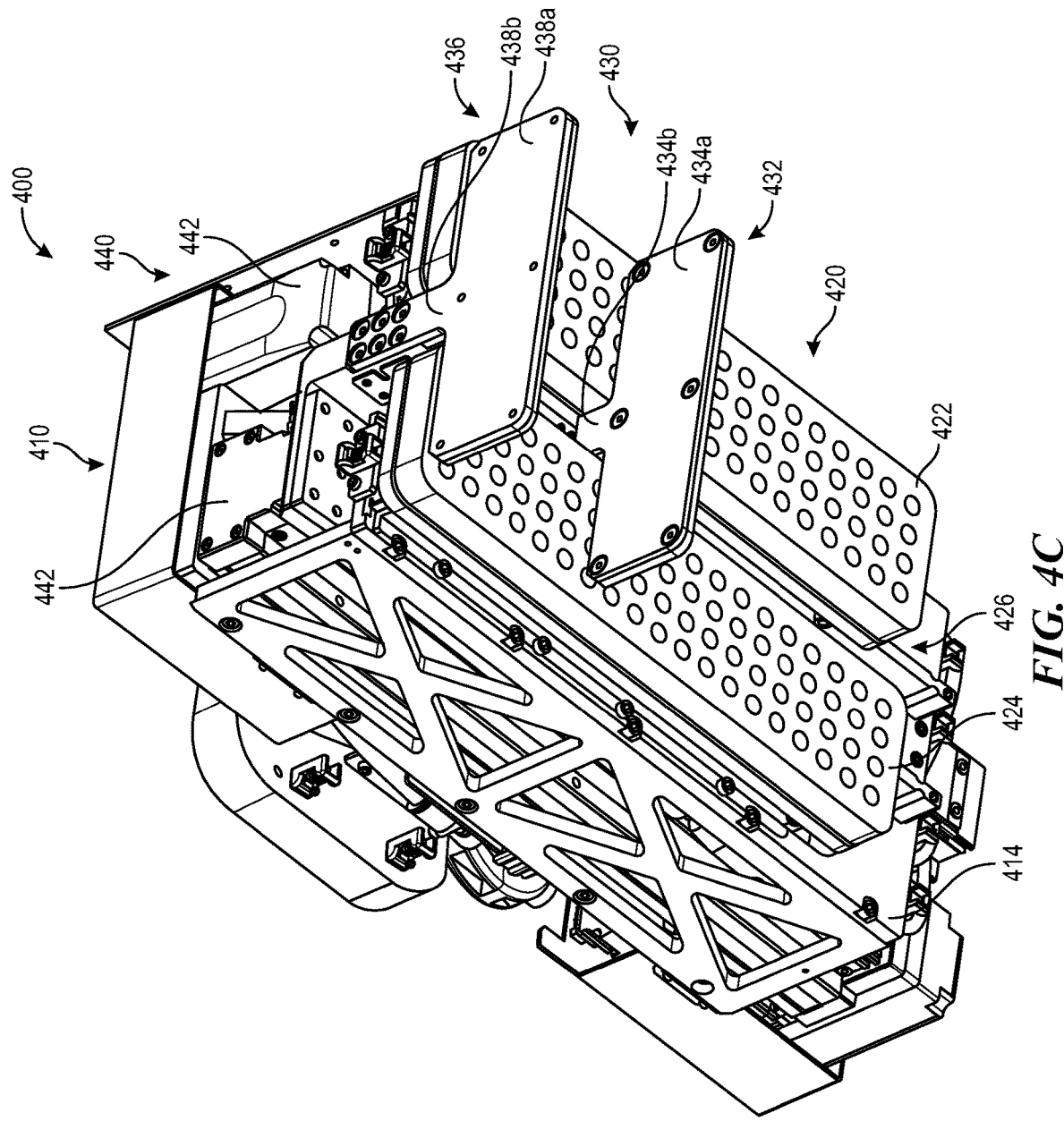
Figure 4D:
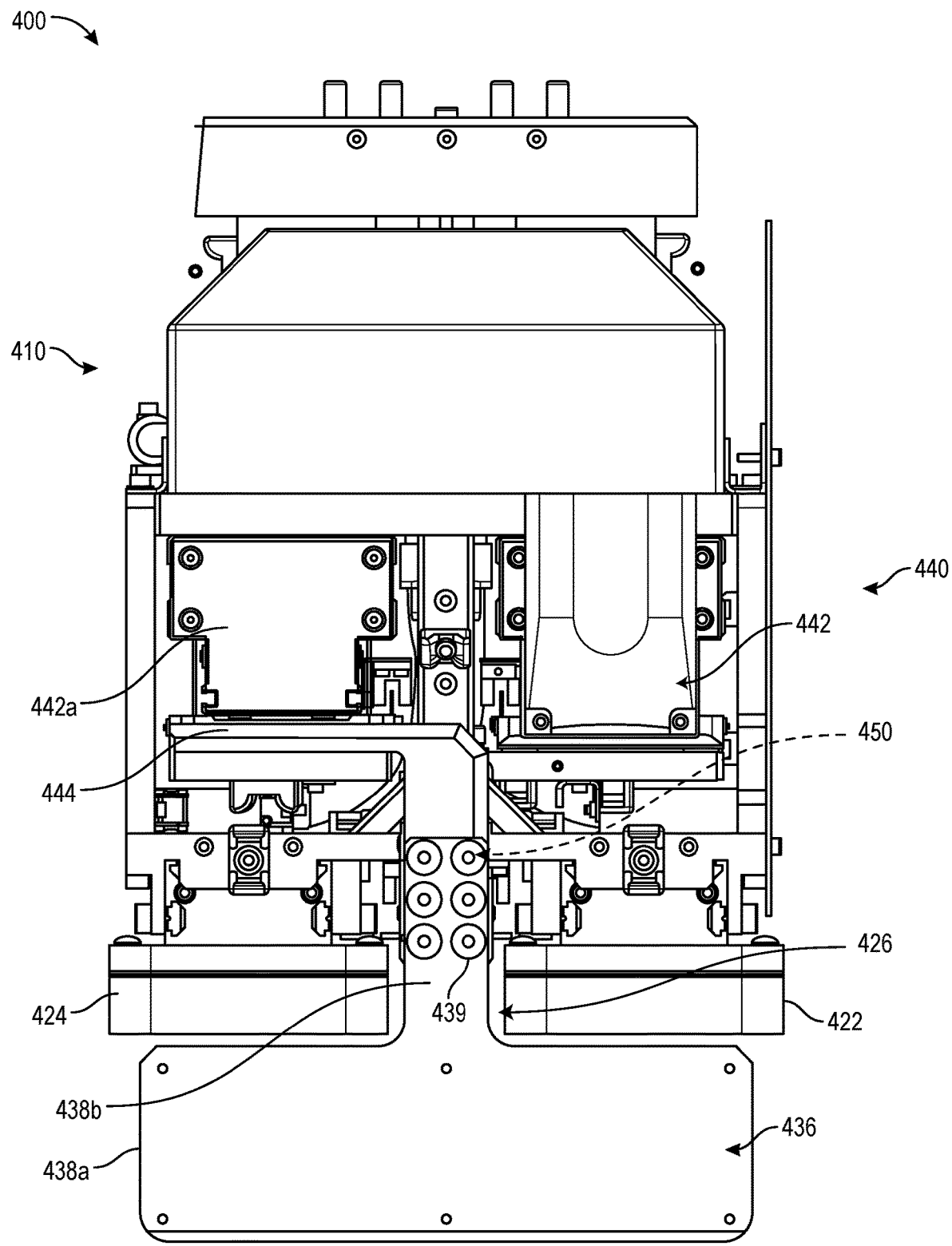

FIGS. 4A-4D are partially schematic views of an end-of-arm tool 400 (e.g., an instance of the end-of-arm tool 320 of FIG. 3) configured in accordance with some embodiments of the present technology. More specifically, FIGS. 4A and 4B are partially schematic side views of the end-of-arm tool 400, FIG. 4C is a partially schematic view of an underside of the end-of-arm tool 400, and FIG. 4D is a partially-schematic front view of the end-of-arm tool 400, each illustrating various features of the end-of-arm tool 400 according to some embodiments of the present technology.

As illustrated in FIGS. 4A and 4B, the end-of-arm tool 400 (sometimes also referred to herein as an "end effector," an "object-gripping assembly," a "gripping assembly," a "grasping mechanism," an "object gripper," a "gripper," a "gripping head" and/or the like) includes a housing 410, as well as a vacuum-gripping component 420 and an object-clamping component 430 each carried by the housing 410. The housing 410 includes a lower surface 412, an upper surface 414 opposite the lower surface 412, and a lead edge 416 (sometimes also referred to herein as a "front surface," "front portion," "forward surface," and/or the like), and a rear edge 418 opposite the lead edge 416. The housing 410 (sometimes also referred to herein as a "frame") can be coupled to a robotic arm (e.g., the robotic arm 310 of FIG. 3) and/or another suitable component via a connection flange 402 on the upper surface of the housing 410.

The vacuum-gripping component 420 ("vacuum component 420," sometimes also referred to herein as a "suction component," a "suction gripper," and/or the like) can be carried by the lower surface 412 of the housing 410. In various embodiments, the vacuum component 420 can include one or more suction cups, vacuum pads, vacuum openings, and/or the like configured to grip or affix a target object to the end-of-arm tool 400. For example, to pick up and transport a target object (e.g., during a grasping operation), the end-of-arm tool 400 can be positioned over the target object and then lowered until the vacuum component 420 contacts an upper surface of the target object. The vacuum component 420, or subsections thereof, can then be operated to apply a vacuum force to an upper surface of the target object, thereby engaging the upper surface. Once engaged, the end-of-arm tool 400 can rise and move to lift and transport the target object from a first location (e.g., a conveyor belt) to a second location (e.g., a pallet or other shipping component, warehouse cart, and the like).

In some embodiments, the vacuum force from the vacuum component 420 is sufficient to lift and transport the target object. However, even in such embodiments, the target object can be unstable during transportation, especially when the end-of-arm tool moves from the first location toward the second location quickly. The instability can lead the end-of-arm tool 400 to occasionally drop the target object. Additionally, the instability can cause the target object to shift on the vacuum component 420, thereby undermining the ability of the end-of-arm tool 400 to accurately place the target object at the second location (e.g., to pack a shipping container). Further, in some embodiments, the target object is too heavy to be gripped by the vacuum component 420 alone.

The object-clamping component 430 ("clamping component 430," sometimes also referred to herein as a "clamping system," "side-gripping component," and/or the like) can help reduce instability and/or allow the end-of-arm tool 400 to fully grip target objects. As illustrated in FIGS. 4A and 4B, the clamping component 430 can include first and second clamping elements 432, 436 that project at least partially from the lower surface 412 of the housing 410 and beneath the vacuum component 420. The first and second clamping elements 432, 436 (sometimes also referred to herein as first and second "clamping components," "plates," "clamping portions," "clamping grippers," and/or the like) can move along a lateral axis (e.g., the x-axis, sometimes also referred to herein as a longitudinal axis of the end-of-arm tool 400) to adjust a distance $D_1$ therebetween. As discussed in more detail below, the movement can allow the first and second clamping elements 432, 436 to clamp (e.g., contact, pinch, grab, stabilize, and/or the like) sides of a target object. The clamping can reduce instability and/or allow the end-of-arm tool 400 to fully grip target objects by providing support for an object on two sides of the target object (e.g., thereby reducing movement of the target object on the vacuum component 420). Additionally, or alternatively, the clamping can reduce instability and/or allow the end-of-arm tool 400 to fully grip target objects by providing an additional gripping force.

In the illustrated embodiment, the first clamping element 432 has a first clamping surface 433 projecting below the lower surface 412 and oriented towards the second clamping element 436. Similarly, the second clamping element 436 has a second clamping surface 437 projecting below the lower surface 412 and oriented towards the first clamping element 432. The first and second clamping surfaces 433, 437 can help facilitate the clamping process. For example, the first and second clamping surfaces 433, 437 can have relatively high coefficients of static friction (e.g., relative to a threshold level with respect to surfaces of targeted objects) to reduce the chance the target object slips once clamped and/or a non-rigid surface to reduce the chance of damaging the target object while clamping. In various embodiments, the first and second clamping surfaces 433, 437 can be a rubber material, a foam material, a silicone material, and/or the like.

As further illustrated in FIGS. 4A and 4B, the clamping component 430 can also include an actuator system 440 that has one or more actuators 442 (two total shown in FIGS. 4A and 4B, one shown in each of FIGS. 4A and 4B). The actuator(s) 442 can be coupled to the first and second clamping elements 432, 436 to drive the motion along the lateral axis. In some embodiments, a first actuator (e.g., the actuator 442 illustrated in FIG. 4A) can drive the motion of the first clamping element 432 while a second actuator (e.g., the actuator 442 illustrated in FIG. 4B) can drive the motion of the second clamping element 436. In some such embodiments, the first and second actuators are operably coupled to the same controller (e.g., the controller 109 of FIG. 1), allowing the motion of the first and second clamping elements 432, 436 to be controlled and/or monitored from a single location. Additionally, or alternatively, in various such embodiments, the first and second clamping elements 432, 436 can move simultaneously, asynchronously, independently, and/or the like.

In some embodiments, the system includes a single actuator 442 that can drive the motion of the first and/or second clamping elements 432, 436. In a specific, non-limiting example, the actuator 442 can include a drive gear that is coupled to the first and/or second clamping elements 432, 436 via one or more disengageable coupling gears. In such embodiments, the single actuator 442 can move the first and second clamping elements 432, 436 simultaneously, asynchronously, independently, and/or the like. In some embodiments, only the first clamping element 432 (or only the second clamping element 436) is coupled to the actuator system 440, while the second clamping element 436 (or the first clamping element 432) is stationary. In a specific, non-limiting example, the actuator system 440 can drive the motion of the first clamping element 432 along the lateral axis while the second clamping element is stationarily aligned with the lead edge 416 of the housing 410. In various embodiments, the actuator system 440 can include arm(s) with a gear track while the actuator(s) 442 include a gear(s) operably coupled to the gear track; the actuator system 440 can include one or more t-track arms while the actuator(s) 442 include drivable bearings coupled to the t-track(s); the actuator system 440 can include one or more extendable arms (e.g., telescoping arms, sliding tracks, and/the like) while the actuator(s) 442 can controllably extend the arms; the actuator system 440 can include cart-and-gear tracks while the actuator(s) 442 include mechanisms for moving the carts (e.g., electric motors); and/or various other suitable mechanisms.

In the embodiments illustrated in FIGS. 4A and 4B, the end-of-arm tool further includes one or more sensors 450 (shown schematically in FIGS. 4A and 4B) that are operably coupled to the actuator system 440 and/or the first and second clamping elements 432, 436. The sensor(s) 450 can include instances of the system sensor 224 of FIG. 2 positioned to measure a force between the first and second clamping elements 432, 436 and the target object, once engaged. As a result, the sensor(s) 450 can allow the robotic system 100 (at, e.g., the end-of-arm tool 400, the corresponding robotic unit, or a separate controller) to detect when the target object is engaged by the clamping system 350 and/or measure the strength of the clamp on the target object. For example, the control unit 202 of FIG. 2 can analyze the output of the sensor(s) 450, locations and/or speeds of the first and second clamping elements 432, 436, changes thereto, or a combination thereof to identify that the first clamping element 432, the second clamping element 436, or both have contacted the target object.

In some embodiments, for example, the sensor(s) 450 include one or more current sensors that measure the current consumed by the actuator system 440 while moving the first and second clamping elements 432, 436. Unresisted movement, before the target object is contacted by the first and/or second clamping elements 432, 436, can consume a first amount of energy (e.g., the actuator(s) 442 draw a first current to move the first and second clamping elements 432, 436). When one (or both) of the first and/or second clamping elements 432, 436 contacts the target object, the movement of the first and/or second clamping elements 432, 436 is resisted. The resisted movement can consume a second amount of energy that is greater than the first amount (e.g., the actuator(s) 442 draw a second, larger current to continue to move the first and second clamping elements 432, 436). The current sensors can measure the current consumed by the actuator system 440 and allow the end-of-arm tool 400 (e.g., via a controller, or another suitable component) to detect the increase when the first and/or second clamping elements 432, 436 contact the target object. In turn, the end-of-arm tool 400 can stop the operation of the actuator(s) 442. By stopping the actuator(s) 442, the end-of-arm tool 400 can stop the motion of the first and/or second clamping elements 432, 436 to stop clamping down on the target object once engaged. As a result, the current sensors (and the controller coupled thereto) allow the end-of-arm tool to reduce (or avoid) damage to the target object by clamping too hard on the sides of the target object.

In some embodiments, the actuator system 440 includes a first actuator operably coupled to the first clamping element 432 and a second actuator operably coupled to the second clamping element 436. In such embodiments, the sensor(s) 450 include a first current sensor operably coupled to the first actuator and a second current sensor operably coupled to the second actuator. As a result, the end-of-arm tool 400 (or another suitable component) can monitor the first and second clamping elements 432, 436 independently. In some embodiments, the end-of-arm tool 400 stops the first and second actuators independently in response to a detected increase in the current consumption. As a result, the first clamping element 432 can move until it engages a first side of the target object while the second clamping element 436 can move until it engages a second side of the target object. The independent stopping can help reduce (or avoid) damage to either side of the target object. In some embodiments, the end-of-arm tool 400 considers the magnitude of the increase in the current consumption to stop the first and second clamping elements 432, 436 only in response to an increase above a predetermined threshold. The predetermined threshold can correspond to an increase expected when both the first and second clamping elements 432, 436 engage the target object. Said another way, the increase in consumption can be below the predetermined threshold when only one of the first and second clamping elements 432, 436 engages the target object. In this case, the increase corresponds to the current consumed by the engaged clamping element pushing the target object toward the non-engaged clamping element. By allowing the engaged clamping element to push the target object toward the non-engaged clamping element, the end-of-arm tool 400 can increase the speed of the clamping process.

In some embodiments, sensor(s) 450 include a single current sensor monitoring the current consumed by the actuator system 440 (e.g., independent of the number of actuators). As a result, the end-of-arm tool 400 monitors the first and second clamping elements 432, 436 in conjunction. In such embodiments, end-of-arm tool 400 can consider the magnitude of the increase in the current consumption to stop the first and second clamping elements 432, 436 only in response to an increase above a predetermined threshold. As discussed above, the predetermined threshold can correspond to an increase expected when both the first and second clamping elements 432, 436 engage the target object.

In some embodiments, the sensor(s) 450 include one or more force sensors positioned to measure a force on the first and/or second clamping surfaces 433, 437. The force sensors can detect when the sides of the target object are engaged by the first and/or second clamping elements 432, 436 and/or the resistance therein. When both the first and second clamping elements 432, 436 have engaged the sidewall (e.g., as indicated by force sensors on first and second clamping surfaces 433, 437 and/or a magnitude of a force on one of first or second clamping surfaces 433, 437), the motion of the first and/or second clamping elements 432, 436 can be stopped. Similarly, in various embodiments, the sensor(s) 450 can include torque sensors positioned to measure a torque on the first and/or second clamping elements 432, 436 (resulting from a resistance from the target object), presence sensors (e.g., imaging components, radar components, radar sensors, and/or the like) positioned to detect the presence of the sides of the target object adjacent to the first and/or second clamping elements 432, 436, and/or any other suitable sensor.

In the embodiment illustrated in FIGS. 4A and 4B, the end-or-arm tool 400 further includes a reinforcing structure 462, one or more covers 464 (two shown), and a calibration component 470. The reinforcing structure 462 can provide structural support to the vacuum component 420 and increase the stability of the end-or-arm tool 400. In some embodiments, an upper surface of the vacuum component 420 is connected to the lower surface 412 of the housing and the reinforcing structure 462 provides additional support to the vacuum component 420. In other embodiments, the vacuum component 420 is coupled to the housing 410 via the reinforcing structure 462.

The cover(s) 464 can provide a protective shield around components of the end-of-arm tool 400 to protect the components from accidental impacts while the end-of-arm tool 400 is operating. For example, the cover(s) 464 can provide a shield around the actuator system 440, input lines to the vacuum component 420, any onboard electronics, and/or the like. Additionally, or alternatively, the cover(s)

464 can help contain various components of the end-of-arm tool 400 (e.g., the input lines to the vacuum component 420) to help avoid accidental snags thereof.

The calibration component 470 can be used to, for example, allow one or more image sensors (e.g., the imaging system 160 of FIG. 1 and/or any other suitable component) to identify the position and/or orientation of the end-of-arm tool 400 within an operating environment and/or relative to the image sensor(s). In some embodiments, the calibration component 470 can include a placard with a pattern or design that assists in identifying the position and/or orientation of the end-of-arm tool 400 within an operating environment and/or relative to the image sensor(s). For example, in the illustrated embodiment, the calibration component 470 includes a structure that has a plurality of reference dots arranged in a pattern that is positionally unique. Accordingly, the pattern can be used to visually identify or locate the end-of-arm tool 400. In some embodiments, a top portion or edge of the calibration component 470 is coplanar with the upper surface 414 of the housing 410. Additionally, or alternatively, in various embodiments, a side portion or edge of the calibration component 470 can be coplanar with the lead edge 416 of the housing 410, a side portion or edge of the calibration component 470 can be coplanar with the lower surface 412 of the housing 410, and/or the like.

FIG. 4C illustrates additional details on various components of the end-of-arm tool 400 from a lower view in accordance with some embodiments of the present technology. For example, as illustrated in FIG. 4C, the vacuum component 420 can include a first vacuum element 422 and a second vacuum element 424 each extending along the longitudinal axis of the end-of-arm tool 400. Further, the second vacuum element 424 is spaced apart from the first vacuum element 422 to create a channel 426 therebetween. Each of the first and second clamping elements 432, 436 of the clamping component 430 is coupled to the actuator system 440 through the channel 426. For example, as further illustrated in FIG. 4C, the first clamping element 432 includes a lower portion 434a and an upper portion 434b. The lower portion 434a projects beyond the vacuum component 420 to contact the sides of the target object. The upper portion 434b extends through the channel 426 and is operatively coupled to one of the actuators 442 (two illustrated in FIG. 4C). Similarly, the second clamping element 436 includes a lower portion 438a projecting beyond the vacuum component 420 and an upper portion 434b extending through the channel 426 and coupled to another one of the actuators 442.

In some embodiments, the vacuum component 420 can be divided into additional vacuum elements (e.g., three vacuum elements, four vacuum elements, and/or any other suitable number of vacuum elements). Purely by way of example, the vacuum component 420 can include four vacuum elements with a first channel along the longitudinal axis of the end-of-arm tool 400 and a second channel along the transverse axis (e.g., the y-axis illustrated in FIG. 4A). In such some embodiments, the clamping component 430 also includes additional clamping elements (e.g., to move and clamp the target object along the x-axis). In some embodiments, the vacuum component 420 includes a single vacuum element. In such embodiments, the upper portions 434b, 438b of the first and second clamping elements 432, 436 extend toward the actuators 442 peripheral to the single vacuum element.

FIG. 4D illustrates additional details on various components of the end-of-arm tool 400 from a front view in accordance with some embodiments of the present technology. For example, FIG. 4D illustrates the channel 426 defined by the first and second vacuum elements 422, 424 and the upper portion 438b of the second clamping element 436 extending through the channel 426. As further illustrated in FIG. 4D, the actuator system 440 can further include a movable arm 444 coupled between a first actuator 442a and the upper portion 438b of the second clamping element 436. In various embodiments, as discussed above, the movable arm 444 can include a gear track that is coupled to a gear in the first actuator 442a to move the movable arm 444 (and therefore the second clamping element 436), a t-track that is coupled to a drivable bearing in the first actuator 442a to move of the movable arm 444 (and therefore move the second clamping element 436), a telescoping body operably coupled to a control mechanism in the first actuator 442a to expand and contract (and therefore move the second clamping element 436), and/or various other mechanisms for moving the second clamping element 436.

In the illustrated embodiment, the upper portion 438b of the second clamping element 436 is coupled to the movable arm 444 via fasteners 439 (six shown in the illustrated embodiment, any suitable number possible). The fasteners 439 can be screws, bolts, pins, and/or any other suitable mechanism. Further, in some embodiments, the fasteners 439 provide a suitable point for one or more of the sensors 450 to measure a force between the second clamping element 436 and the target object. For example, as the lower portion 438a engages a side surface of the target object, the upper portion 438b pushes away from the movable arm 444 through the fasteners 439, thereby exerting a force through the sensors 450. The sensors 450 can measure the force to allow the end-of-arm tool 400 to reduce the risk of damage to the target object (e.g., as discussed in more detail above).

Figure 5A:
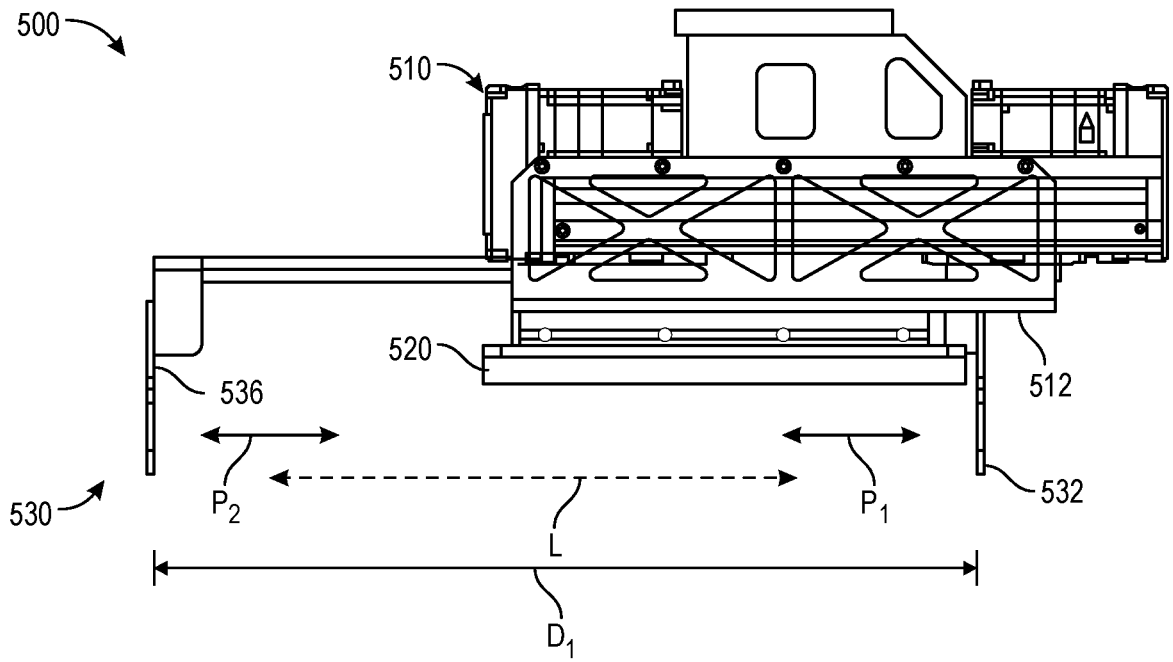
FIGS. 5A and 5B are partially schematic side views of an end-of-arm tool moving between first and second positions in accordance with some embodiments of the present technology.
Figure 5B:
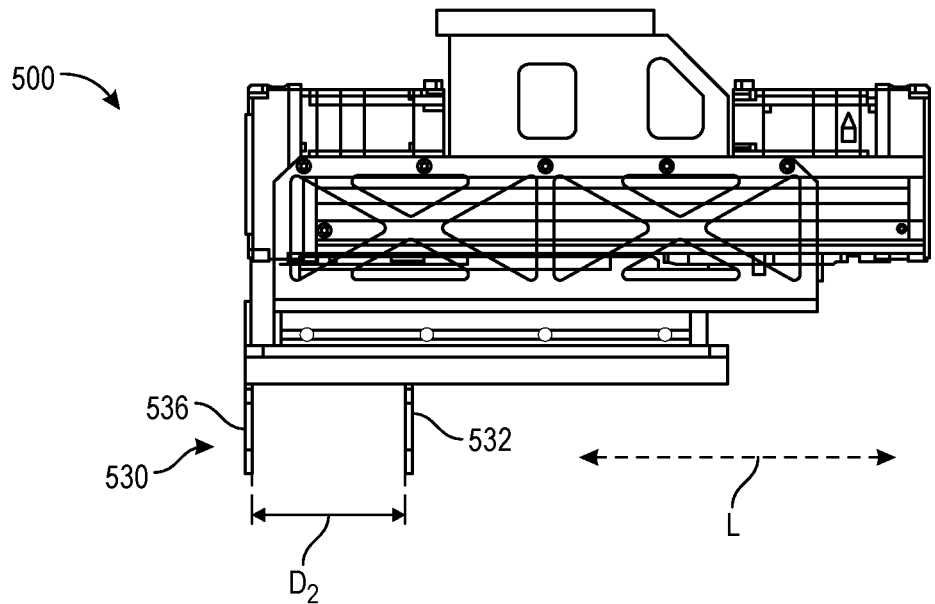

FIGS. 5A and 5B are partially schematic side views of an end-of-arm tool 500 moving between first and second positions in accordance with some embodiments of the present technology. As illustrated in FIG. 5A, the end-of-arm tool 500 is generally similar to the end-of-arm tool 400 described above with reference to FIGS. 4A-4D. For example, the end-of-arm tool 500 illustrated in FIG. 5A includes a housing 510, a vacuum component 520 operably coupled to a lower surface 512 of the housing 510, and a clamping component 530 that includes first and second clamping elements 532, 536 projecting beneath the vacuum component 520.

As further illustrated in FIG. 5A, the first clamping element 532 is movable along a first motion path $P_1$ and the second clamping element 536 is movable along a second motion path $P_2$. As a result, the first and second clamping elements 532, 536 can move between a first position (e.g., illustrated in FIG. 5A) and a second position (e.g., as illustrated in FIG. 5B) to move between various clamping and non-clamping states. In the first position (FIG. 5A), the first and second clamping elements 532, 536 are spaced apart by a first distance $D_1$. In the second position (FIG. 5B), the first and second clamping elements 532, 536 are spaced apart by a second distance $D_2$ that is smaller than the first distance $D_1$. The varying distances allow the first and second clamping elements 532, 536 to clamp target objects of various sizes. In various embodiments, the first and second clamping elements 532, 536 can move along the first and second motion paths $P_1$, $P_2$ to vary the distance ($D_2$ to $D_1$) from about 0 meters (m) to about 2 m, from about 0.05 m to about 1.5 m, or from about 0.1 m to about 1 m to clamp a variety of sizes of target objects.

In the embodiment illustrated in FIGS. 5A and 5B, the first and second motion paths $P_1$, $P_2$ are each generally parallel (or parallel) to a longitudinal axis L of the end-of-arm tool 500. The parallel orientation can help simplify positioning the end-of-arm tool 500 over a target object to be gripped by both the vacuum component 520 (FIG. 5A) and the clamping component 530. However, it will be understood that, in various other embodiments, the first and second motion paths $P_1$, $P_2$ can be at any suitable angle to the longitudinal axis of the arm.

Further, in the embodiment illustrated in FIGS. 5A and 5B, the first and second clamping elements 532, 536 move along the first and second motion paths $P_1$, $P_2$ in an asymmetrical configuration. More specifically, the first motion path $P_1$ of the first clamping element 532 is shorter than the second motion path $P_2$ of the second clamping element 536. However, it will be understood that, in various other embodiments, the first motion path $P_1$ can be greater than the second motion path $P_2$ or equal to the second motion path $P_2$. Still further, in various embodiments, the motion paths followed by the first and second clamping elements 532, 536 are at least partially based on the target object being gripped by the end-of-arm tool 500, the pick-up location, the placing location, and/or the environment surrounding the end-of-arm tool 500 during transportation. In a non-limiting example, the motion path followed by the first clamping element 532 can be longer than the second motion path followed by the second clamping element 536 for a first target object based on a preferred gripping location for the vacuum component 520; equal to the second motion path for a second target object to equally distribute the weight of the target object; and smaller than the second motion path for a third target object to help avoid contact with other objects at the placing location.

Figure 6A:
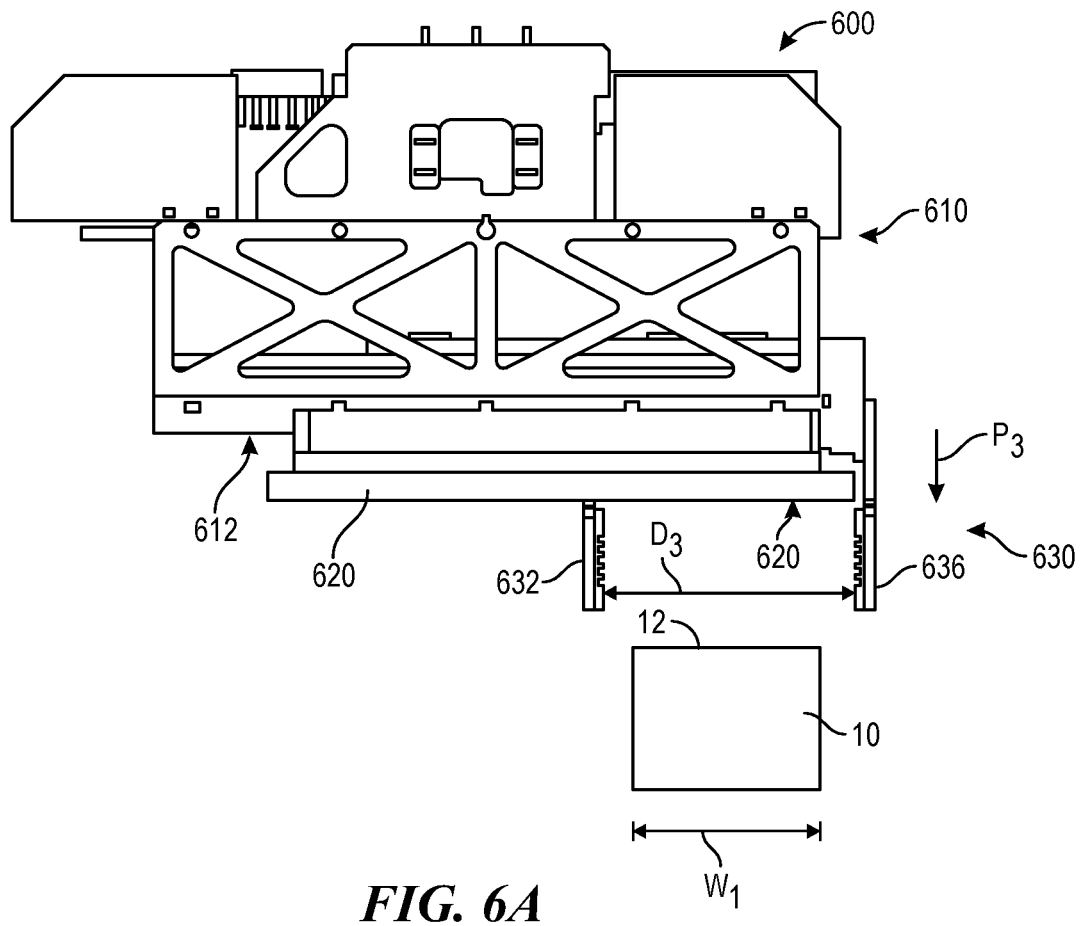
FIGS. 6A-6D are partially schematic views illustrating an end-of-arm tool at various stages of a grasping operation in accordance with some embodiments of the present technology.

FIGS. 6A-6D are partially schematic views illustrating an end-of-arm tool 600 of the type discussed with respect to FIGS. 4A-5B at various stages of a grasping operation in accordance with some embodiments of the present technology. For example, as illustrated in FIG. 6A, the end-of-arm tool 600 includes a housing 610, a vacuum component 620 operably coupled to a lower surface 612 of the housing 610, and a clamping component 630 that includes first and second clamping elements 632, 636 projecting beneath the vacuum component 620. The operations associated with the grasping operation illustrated in FIGS. 6A-6D can be executed by a controller on the end-of-arm tool 600 itself and/or by an external controller (e.g., the controller 109 of FIG. 1 having the control unit 202 of FIG. 2).

FIG. 6A illustrates the end-of-arm tool 600 approaching a target object 10. During the approach, the first and second clamping elements 632, 636 are positioned a starting distance $D_3$ (sometimes also referred to herein as an initial width) that is greater than or equal to a width $W_1$ of the target object 10. Further, the end-arm-arm tool 600 positions itself (or is positioned) at least partially over the target object 10 with the target object between the first and second clamping elements 632, 636. The end-of-arm tool 600 then moves along a third motion path $P_3$ (e.g., a vertical motion path and/or a motion path having a vertical component) until the vacuum component 620 contacts an upper surface 12 of the target object 10.

In some embodiments, the starting distance $D_3$ provides a predetermined amount of clearance for the first and second clamping elements 632, 636 on each side of the target object 10. Purely by way of example, the starting distance $D_3$ can provide about 0.5 m of clearance on each side of the target object, about 0.2 m of clearance on each side of the target object, about 0.1 m of clearance on each side of the target object, and/or any other suitable amount of clearance. In some embodiments, the starting distance $D_3$ is scaled up from the width $W_1$ of the target object. Purely by way of example, the starting distance $D_3$ can be about 25 percent larger than the width $W_1$, about 10 percent larger than the width $W_1$, about 5 percent larger than the width $W_1$, and/or any other suitable size.

Figure 6B:
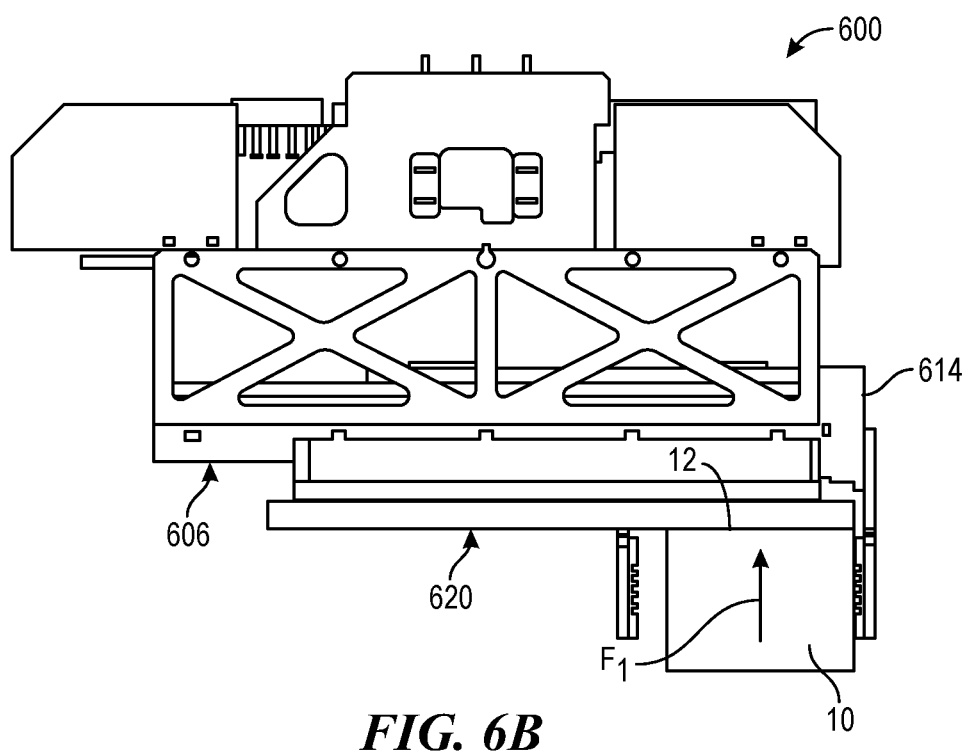
Figure 6C:
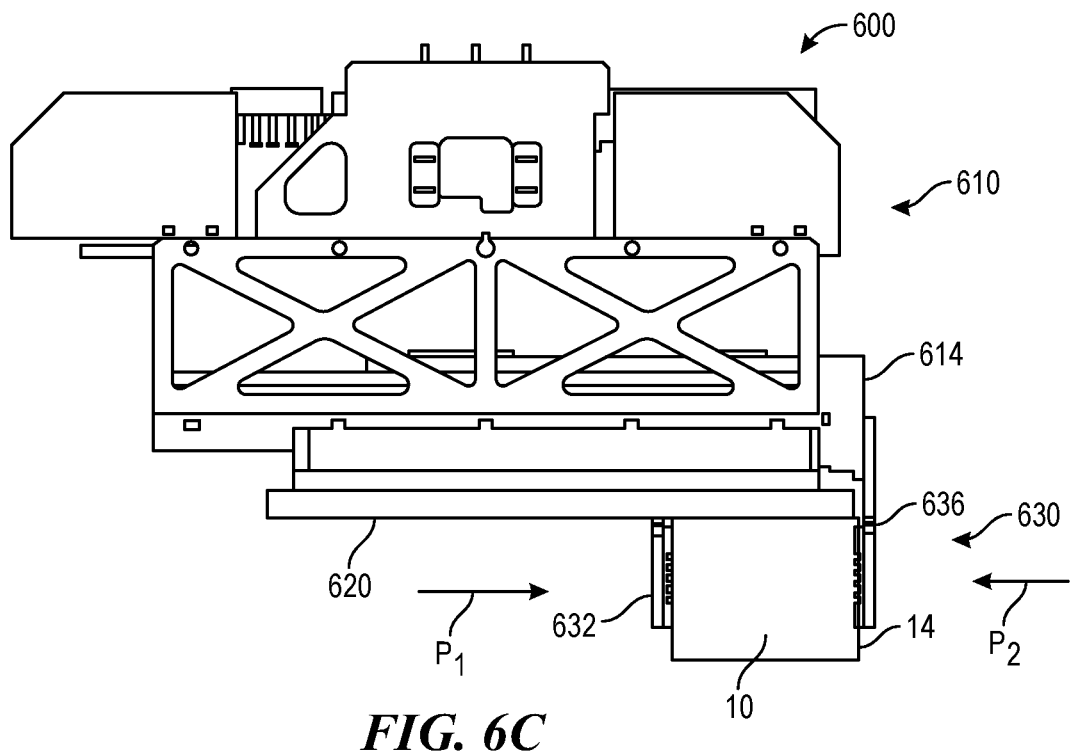

FIGS. 6B and 6C illustrate the end-of-arm tool 600 gripping the target object after the approach. For example, as illustrated in FIG. 6B, the gripping process can include applying a suction force $F_1$ to the upper surface 12 of the target object 10 via one or more vacuum elements in the vacuum component 620 (sometimes also referred to as suction elements). In some embodiments, only a subsection of the vacuum component 620 operates (e.g., rather than the entire vacuum component 62) to apply the suction force $F_1$. For example, the vacuum component 620 can operate only the vacuum elements that are in contact with the upper surface 12 of the target object 10. In another example, the vacuum component 620 can operate only vacuum elements in a region (e.g., the suction elements in a half, third, quarter, and/or any other suitable division) in contact with the upper surface 12 of the target object 10. The selective operation can reduce the energy consumed by the end-arm-arm tool 600, reduce movement/jitters caused by any non-engaged vacuum elements, and/or increase the suction force $F_1$ applied to the target object 10 (e.g., by concentrating the vacuum force).

As illustrated in FIG. 6C, the gripping process also includes moving the first and second clamping elements 632, 636 along the first and second motion paths $P_1$, $P_2$, respectively, to engage side surfaces 14 of the target object 10. In the illustrated embodiment, the second clamping element 636 was nearly in contact with the right side surface 14 of the target object 10 before moving along the second motion path $P_2$ (e.g., compare FIG. 6B and FIG. 6C). As a result, as discussed in more detail above, the clamping component 630 can stop moving the second clamping element 636 while the first clamping element 632 continues to move along the first motion path $P_1$. However, it will be understood that the end-of-arm tool 600 can position itself (or be positioned) such that the first and second clamping elements 632, 636 are generally equidistant from the target object 10 before moving such that the first and second clamping elements 632, 636 engage the side surfaces 14 of the target object 10 at generally the same time (or the same time). Additionally, or alternatively, the first and second clamping elements 632, 636 can each continue to move until the first and second clamping elements 632, 636 each engage the target object 10. In such embodiments, the vacuum component 620 can be engaged after the clamping component 630 to allow the target object 10 to move laterally without resistance resulting from the suction force $F_1$ (FIG. 6B).

In the illustrated embodiment, the second clamping element 636 is generally aligned with the lead edge 614 of the housing 610 after the target object 10 is gripped. Further, the target object 10 is carried by a forward half (e.g., a half closer to the lead edge 614) if the vacuum component 620. The illustrated alignment and carrying arrangement can help facilitate gripping and/or releasing the target object 10 in places with relatively low clearance. For example, the target object 10 is clamped fully within the longitudinal footprint of the end-of-arm tool 600, which is the minimum longitudinal footprint for the end-of-arm tool 600 during operation (e.g., as opposed to a configuration where the second clamping element 636 extends distal to the lead edge 614). In various embodiments, however, the first and second clamping elements 632, 636 can be aligned with various other features while clamping the target object 10 and/or can be positioned to allow the vacuum component 620 to apply the suction force $F_1$ FIG. 6B) to a particular region of the target object 10.

Figure 6D:
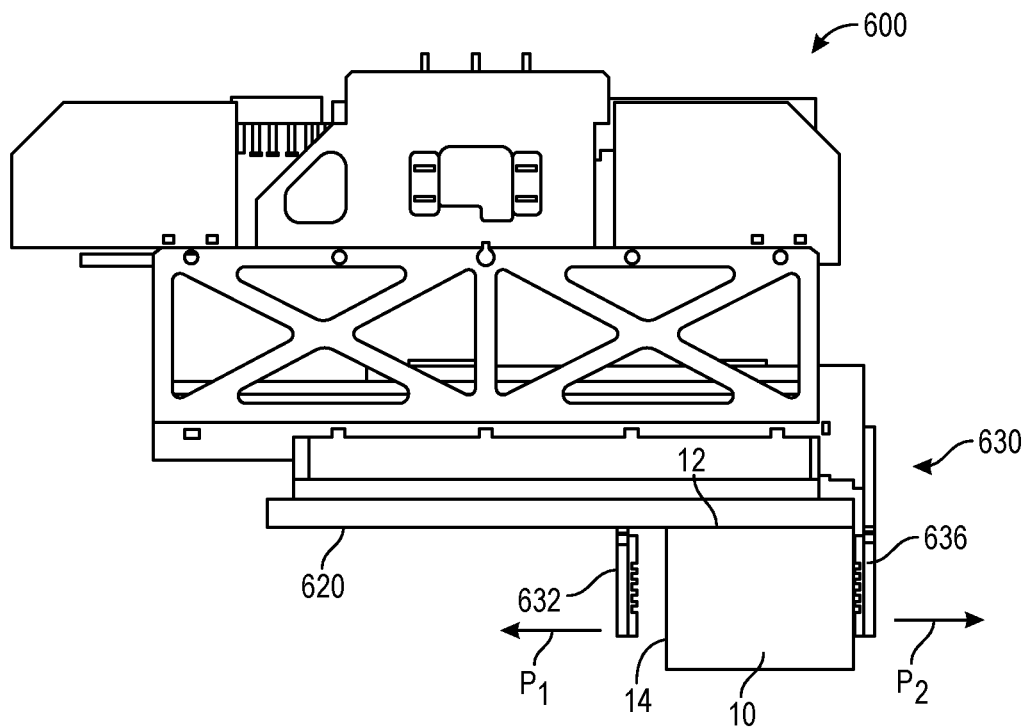

FIG. 6D illustrates the end-of-arm tool 600 while releasing the target object 10 at a placement location. The placement location can be a pallet or other suitable shipping unit, a warehouse cart or other suitable warehouse component, and/or any other suitable location. To release the target object 10, the end-of-arm tool 600 stops operating the vacuum component 620 and moves at least one of the first and second clamping elements 632, 636 along the first and second motion paths $P_1$, $P_2$, respectively. As a result, the vacuum component 620 disengages (e.g., stops applying a suction force to) the upper surface 12 of the target object 10 and clamping component 630 disengages the side surfaces 14 of the target object 10. In the illustrated embodiment, only the first clamping element 632 is moving to release the target object 10. In various other operations, both the first and second clamping elements 632, 636 can move and/or only the second clamping element 636 can move. The selective movement can be based on the environment and/or clearance at the placement location to avoid undesired contact with the surrounding environment. That is, because only one of the first and second clamping elements 632, 636 needs to move to stop clamping the side surfaces 14 of the target object 10, the end-of-arm tool 600 (or another suitable component) can select which of the first and second clamping elements 632, 636 as suitable to the placement location.

Figure 7:
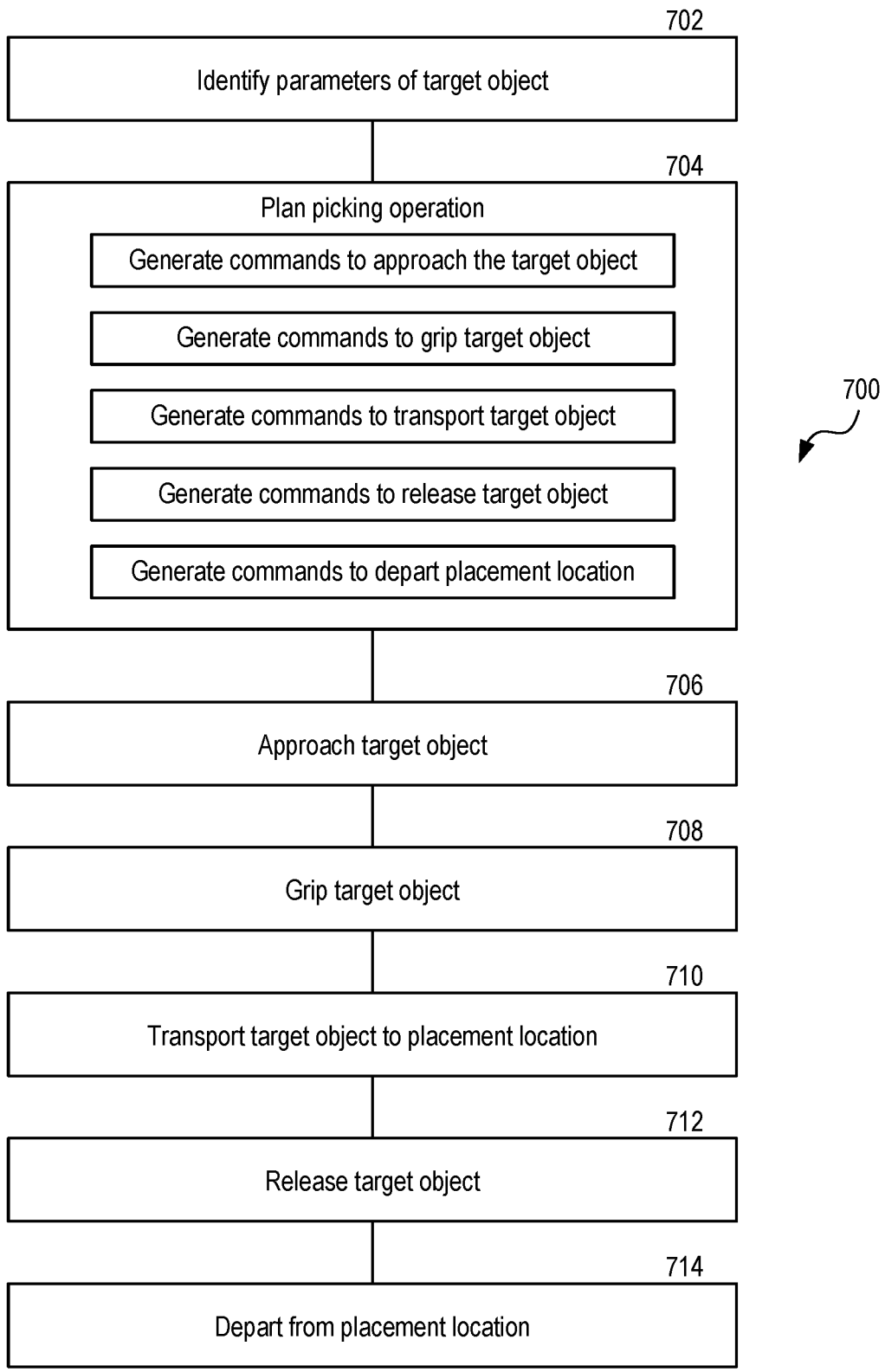
FIG. 7 is a flow diagram of a process for operating a robotic system with an object-gripping assembly in accordance with some embodiments of the present technology.

FIG. 7 is a flow diagram of a process 700 for operating a robotic system with an end-of-arm tool in accordance with some embodiments of the present technology. The process 700 can be executed by a controller on the end-of-arm tool itself and/or by an external controller (e.g., the controller 109 of FIG. 1 having the control unit 202 of FIG. 2).

The process 700 begins at block 702 by identifying one or more parameters of a target object. The parameters can include a length, width, height, weight, expected weight, weight distribution, expected weight distribution, wall strength, expected wall strength, rigidity, and/or any other suitable parameter. In some embodiments, the parameter(s) are identified by one or more sensors (e.g., sensor units 216 of FIG. 2 and/or imaging system 160 of FIG. 1). Alternatively or additionally, the parameter(s) can be retrieved from a database (e.g., a cloud database or other suitable database) using a unique identifier (e.g., barcode, QR code, RFID and/or any other suitable identifier) on the target object.

As an illustrative example, the robotic system 100 can obtain image data (e.g., 2-dimensional and/or 3-dimensional representation of the starting location 114) having the target object 112 and/or various objects in the surrounding environment. The robotic system 100 can identify the edges, the surface texture (e.g., images and/or characters printed on the surface of the objects), heights, or the like to identify candidate objects depicted in the image data. The robotic system 100 can compare the identified candidate objects and characteristics thereof (e.g., edge lengths, surface textures, etc.) to those of objects registered in the master data. Based on matching a registered object, the robotic system 100 can detect the object depicted in the image data based on identifying a type or an identifier for the depicted location and based on locating the depicted object.

At block 704, the process 700 includes planning a grasping operation based on the parameter(s) identified/detected at block 702, an environment surrounding the target object at a picking location (e.g., in a conveyor belt and/or any other suitable location), and/or an environment at a placement location (e.g., on a warehouse cart, in a pallet container, and/or any other suitable location). Planning the grasping operation can include: planning an approach for the end-of-arm tool (e.g., as illustrated in FIG. 6A) that includes a starting distance between the clamping elements, a target position for the vacuum component to engage, a travel path, and/or any other suitable details; operations for engaging and gripping the targeted object (via, e.g., the vacuum component and the clamping elements), planning a travel path between the picking location and the placement location while avoiding contact with a surrounding environment; and planning a releasing operation that identifies a placement location, which of the clamping elements to move to disengage the target object, a travel path away from the placement location (e.g., a departing trajectory), and/or any other suitable details. In some embodiments, planning the grasping operation includes generating commands for each stage of the grasping operation that can be executed by the end-of-arm tool and/or any controller coupled thereto to execute the grasping operation. Additionally, planning the grasping operation at block 704 can include generating commands for one or more components of the robotic system (e.g., the robotic system 100 of FIG. 1) and/or components thereof (e.g., the robotic unit 300 of FIG. 3, the end-of-arm tool 400 of FIGS. 4A and 4B, and the like) to execute to complete one or more of the operations discussed above. For example, as illustrated in FIG. 7, planning the grasping operation at block 704 can include generating commands to approach the target object, generating commands to grip the target object, generating commands to transport the target object, generating commands to release the target object, and/or generating commands to depart from the placement location.

In planning the grasping operation, the robotic system 100 can derive a targeted vacuum location on the target object to align with a reference location of the vacuum interface/surface. The robotic system 100 can derive the targeted vacuum location such that the targeted object is centered or boundary-aligned with targeted section(s) of the vacuum interface. Further, the robotic system 100 can plan a targeted clamping location and/or operation of the clamping elements (also referred to as a planned gripping location). For example, the robotic system 100 can compute the targeted locations of the clamping elements using the targeted vacuum and the dimensions of the detected object. Also, the robotic system 100 can operate the clamping elements at a faster speed, a lower sampling frequency for monitoring the feedback sensors, or similar settings for operating the clamping elements outside of a threshold distance from the planned grip location. The robotic system 100 can adjust the settings, such as the movement speed, the sampling sensitivity, or the like when the clamping elements are closer to the targeted clamping locations (e.g., beyond the threshold location surrounding the targeted locations).

Similarly, the robotic system 100 can use the current location and the targeted location of the clamping elements to anticipate the relative contact timings and the corresponding sensor results. For example, the robotic system 100 can anticipate simultaneous timing or a delay between separate contact events for the opposing clamping elements based on the current location and the targeted location of the clamping elements. The robotic system 100 can use the anticipated timing to plan setting changes, check for statuses, and/or detect potential error conditions. In some embodiments, the robotic system 100 can include adjustments in the plan to reposition the clamping elements to be at equal distances away from the targeted locations. The robotic system 100 can include the adjustments in the approach portion of the plan.

At block 706-714, the process 700 then includes implementing the planned grasping operation. At block 706, the process 700 includes approaching the target object. As illustrated in FIG. 6A, the approach can include positioning the end-of-arm tool above the target object with the target object between the clamping elements (e.g., at the targeted locations thereof), then lowering the end-of-arm tool toward the target object.

At block 708, the process 700 includes gripping the target object. As illustrated in FIGS. 6B and 6C, gripping the target object can include moving the clamping elements to clamp on side surfaces of the target object and operating the vacuum component to apply a suction force to an upper surface of the target object. Further, as discussed in more detail above, the gripping process can include one or more sensors coupled to the clamping component to determine when the side surfaces of the target object are engaged and/or clamped with a desired pressure/strength. For example, the end-of-arm tool can include one or more current sensors that are operably coupled to the actuator system that moves the clamping elements. As discussed above, the actuator system can consume a first amount of energy before the clamping elements contact the target object, a second amount of energy when only one of the clamping elements contacts the target object (and, e.g., pushes the target object toward the other clamping element), and a third amount of energy when both clamping elements contact the target object. The current sensors can measure the energy consumption, allowing the end-of-arm tool (or other suitable component in the robotic system 100 of FIG. 1) to detect when the clamping elements are engaged, measure and/or control the clamping pressure, and/or stop the clamping elements once engaged.

In some embodiments, the motion plan can include first engaging the vacuum-based grip and then operating the clamping elements to reinforce the vacuum-based grip. In other embodiments, the motion plan can first engage the clamping elements, such as for adjusting or centering the target object, and then engaging the vacuum-based grip. In other embodiments, the motion plan can operate the clamping elements to adjust the object(s), widen by a predetermined amount, and then re-engage after the vacuum-based grip. As an illustrative example, the robotic system can use the clamping elements to pinch two or more adjacently placed objects (by, e.g., moving one of the clamping elements to remove a gap between the adjacently placed objects) before engaging the vacuum interface to grip the multiple adjacently placed objects. The robotic system can re-engage the clamping elements such that the lateral forces provided by the clamping elements compress the objects together. Additionally, the motion plan can include operations to partially retract the clamping elements after engaging the target object. Accordingly, in gripping the target object, the end-of-arm tool can use the clamping elements to further pull the gripped object into the vacuum interface.

Once gripped, at block 710, the process 700 includes transporting the target object from the picking location to a placement location. In some embodiments, the process 700 at block 710 includes monitoring the environment during transportation to detect and avoid hazards and/or obstacles (e.g., humans and/or other robotics moving in the vicinity of the end-of-arm tool).

At block 712, the process 700 includes releasing the target object at the placement location. As illustrated in FIG. 6D, releasing the target object can include inactivating the vacuum component and moving one (or both) of the clamping elements to disengage the target object. Once disengaged, at block 714, the process 700 includes departing from the placement location. As discussed above, the departure can be along a planned trajectory to avoid impacting the target object and/or the surrounding environment at the placement location.

Once completed, the process 700 can return to block 702 to for the next target object. In some embodiments, the parameter(s) of the next target object are the same (or generally similar), allowing the process 700 to quickly move to block 704 and reuse some of the planned grasping operation (e.g., a planned configuration for the end-of-arm tool). In some embodiments, the parameter(s) of the next target object are different, requiring the process 700 to plan a completely new grasping operation.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. An end-of-arm tool, comprising:
   a housing;
   a vacuum-gripping component operably coupled to a lower surface of the housing for engaging an upper surface of a target object; and
   a clamping component, including:
      a first clamping element positioned at least partially beneath the lower surface of the housing and movable along a lateral axis to engage a first side surface of the target object; and
      a second clamping element positioned at least partially beneath the lower surface of the housing and movable along the lateral axis to engage with a second side surface of the target object, wherein the first and second clamping elements are configured to provide compressing forces on opposing first side surface and second side surfaces of the target object.

2. The end-of-arm tool of example 1 wherein the vacuum-gripping component includes:
   a first vacuum element operably coupled to a first side of the lower surface; and
   a second vacuum element coupled to a second side of the lower surface and spaced apart from the first vacuum element to define a gap therebetween.

3. The end-of-arm tool of example 2 wherein the first clamping element and the second clamping element are operably coupled to the housing through the gap defined by the first and second vacuum elements.

4. The end-of-arm tool of any of examples 1-3 wherein the first clamping element is movable along the lateral axis independent from the second clamping element.

5. The end-of-arm tool of any of examples 1-5 wherein the clamping component further comprises an actuator system operably coupled between the housing and the first and second clamping elements, wherein the actuator system controls movement of the first and second clamping elements along the lateral axis.

6. The end-of-arm tool of example 5, further comprising:
one or more sensors operably coupled to the actuator system to measure a force between the first and second clamping elements and the first and second side surfaces of the target object; and
a controller operably coupled to the one or more sensors and the actuator system, the controller storing instructions that, when executed by the controller, cause the controller to:
receive one or more signals from the sensor related to the force; and
stop the movement of the first and second clamping elements, via the actuator system, when a magnitude of the force meets or exceeds a threshold value representative of the first and second clamping elements contacting and engaging the corresponding first and second side surfaces.

7. The end-of-arm tool of example 6 wherein the one or more sensors include a current sensor coupled to an input line for the actuator system to measure a current to the actuator system.

8. The end-of-arm tool of any of examples 6 and 7 wherein the one or more sensors include a force sensor positioned to measure resistance to the movement of the first and second clamping elements.

9. The end-of-arm tool of any of claims 6-8 wherein the threshold value is a predetermined value configured to avoid damage to the target object from the first and second clamping elements.

10. A method for operating an end-of-arm tool, the method comprising:
identifying parameters of a target object, the parameters including at least one of a length of the target object or a width of the target object;
generating commands for approaching the target object with the end-of-arm tool, wherein the end-of-arm tool comprises a frame, a vacuum-gripping component operably coupled to a lower surface of the frame, and a clamping system having first and second clamping elements projecting from the lower surface of the frame, and wherein approaching the target object includes positioning the end-of-arm tool such that the target object is between the first and second clamping elements;
generating commands for grasping the target object using the vacuum-gripping component and the first and second clamping elements;
generating commands for transporting the target object from a pick-up location to a placing location; and
generating commands for releasing the target object at the placing location.

11. The method of example 10 wherein generating the commands for grasping the target object includes:
generating commands for moving the first and second clamping elements along a longitudinal axis of the end-of-arm tool toward sidewalls of the target object; and
generating commands for applying a suction force to an upper surface of the target object via the vacuum-gripping component.

12. The method of example 11 wherein:
the end-of-arm tool further includes:
an actuator system operably coupled to the first and second clamping elements; and
a sensor operably coupled to the actuator system to measure a current required to move first and second clamping elements along the longitudinal axis; and
generating the commands for grasping the target object further includes:
generating commands to obtain, from the sensor, one or more signals related to the current required to move first and second clamping elements along the longitudinal axis;
generating commands to detect, based on the one or more signals, when the first and second clamping elements engage the sidewalls of the target object; and
generating commands for stopping movement of first and second clamping elements along the longitudinal axis.

13. The method of any of examples 10-12 wherein generating the commands for approaching the target object includes:
determining, from the parameters of the target object, an initial width between the first and second clamping elements; and
generating commands to move at least one of the first and second clamping elements along a longitudinal axis of the end-of-arm tool to position the first and second clamping elements at the initial width.

14. The method of example 13 wherein the initial width is less than ten percent larger than one of the length of the target object or the width of the target object.

15. The method of any of examples 10-14 wherein generating the commands for releasing the target object in the placing location includes:
identifying a trajectory from the placing location for the end-of-arm tool without impacting an environment around the placing location;
generating commands for moving at least one of the first and second clamping elements along a longitudinal axis of the end-of-arm tool away from a sidewall of the target object;
generating commands for disengaging an upper surface of the target object with the vacuum-gripping component; and
generating commands for moving the end-of-arm tool along the identified trajectory.

16. The method of any of examples 10-15 wherein the parameters of the target object include a surface area of an upper surface of the target object, and wherein generating the commands for grasping the target object includes:
identifying a subsection of the vacuum-gripping component corresponding to the upper surface after approaching the target object based on the surface area; and
generating commands for operating the subsection of the vacuum-gripping component to apply a suction force to the upper surface.

17. A robotic system, comprising:
a robotic arm; and an end effector operably coupled to the robotic arm, the end effector comprising:
a housing having a lower surface;
a suction-gripping component coupled to the lower surface of the housing; and
an object-clamping component, comprising:
a first clamping portion projecting from the lower surface beyond the suction-gripping component;
a second clamping portion projecting from the lower surface beyond the suction-gripping component; and
an actuator system operably coupled to the first clamping portion to move the first clamping portion along a motion path parallel to a lateral axis of the housing.

18. The robotic system of example 17 wherein the end effector further comprises one or more sensors operably coupled to the actuator system, and wherein the robotic system a controller operably coupled to the one or more sensors to:
- receive one or more sensor signals while the actuator system is moving the first clamping portion along the motion path;
- detect, based on the one or more sensor signals, when the object-clamping component engages side surfaces of a target object with a predetermined clamping force; and
- generate commands for the actuator system that cause the actuator system to stop moving the first clamping portion along the motion path.

19. The robotic system of any of examples 17 and 18 wherein the motion path is a first motion path, and wherein the actuator system is further operably coupled to the second clamping portion to move the second clamping portion along a second motion path parallel to the lateral axis of the housing.

20. The robotic system of example 19 wherein, along the second motion path, the second clamping portion is movable between a first position spaced apart from a front edge of the housing and a second position at least partially aligned with the front edge of the housing.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Further, the terms "approximately" and "about" are used herein to mean within at least within 10 percent of a given value or limit. Purely by way of example, an approximate ratio means within a ten percent of the given ratio.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments.

Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. An end-of-arm tool, comprising:
a housing;
a vacuum-gripping component operably coupled to a lower surface of the housing for engaging an upper surface of a target object, wherein the vacuum-gripping component includes:
- a first vacuum element operably coupled to a first side of the lower surface; and
- a second vacuum element coupled to a second side of the lower surface and spaced apart from the first vacuum element with a channel therebetween; and a clamping component, including:
- a first clamping element positioned at least partially beneath the lower surface of the housing and movable along a lateral axis to engage a first side surface of the target object; and
- a second clamping element positioned at least partially beneath the lower surface of the housing and movable along the lateral axis to engage with a second side surface of the target object, wherein the first clamping element and the second clamping element are:
  - configured to provide compressing forces on opposing first side surface and second side surfaces of the target object, and
  - operably coupled to the housing through the channel between the first vacuum element and the second vacuum element.

2. The end-of-arm tool of claim 1 wherein the first clamping element is movable along the lateral axis independent from the second clamping element.

3. The end-of-arm tool of claim 1 wherein the clamping component further comprises an actuator system operably coupled between the housing and the first clamping element and the second clamping element, wherein the actuator system controls movement of the first clamping element and the second clamping element along the lateral axis.

4. The end-of-arm tool of claim 3, further comprising:
- a sensor operably coupled to the actuator system to measure a force between the first clamping element and the second clamping element and the first side surface and the second side surface of the target object; and
- a controller operably coupled to the sensor and the actuator system, the controller storing instructions that, when executed by the controller, cause the controller to:
  - receive one or more signals from the sensor related to the force; and
  - stop the movement of the first clamping element and the second clamping element, via the actuator system, when a magnitude of the force meets or exceeds a threshold value representative of the first clamping element and the second clamping element contacting and engaging the first side surface and the second side surface, respectively.

5. The end-of-arm tool of claim 4 wherein the sensor is a current sensor coupled to an input line for the actuator system to measure a current to the actuator system.

6. The end-of-arm tool of claim 4 wherein the sensor is a force sensor positioned to measure resistance to the movement of the first clamping element and the second clamping element.

7. The end-of-arm tool of claim 4 wherein the threshold value is a predetermined value configured to avoid damage to the target object from the first clamping element and the second clamping element.

8. A method for operating an end-of-arm tool, the method comprising:
    identifying parameters of a target object, the parameters including at least one of a length of the target object or a width of the target object;
    generating commands for approaching the target object with the end-of-arm tool, wherein the end-of-arm tool comprises a frame, a vacuum-gripping component operably coupled to a lower surface of the frame, and a clamping system having a first clamping element and a second clamping element projecting from the lower surface of the frame, and wherein approaching the target object includes positioning the end-of-arm tool such that the target object is between the first clamping element and the second clamping element, wherein:
        the vacuum-gripping component includes a first vacuum element and second vacuum element spaced apart with a channel therebetween, and
        the first clamping element and the second clamping element are operably coupled to the frame through the channel between the first vacuum element and the second vacuum element;
    generating commands for grasping the target object using the vacuum-gripping component and the first clamping element and the second clamping element;
    generating commands for transporting the target object from a pick-up location to a placing location; and
    generating commands for releasing the target object at the placing location.

9. The method of claim 8 wherein generating the commands for grasping the target object includes:
    generating commands for moving the first clamping element and the second clamping element along a longitudinal axis of the end-of-arm tool toward sidewalls of the target object; and
    generating commands for applying a suction force to an upper surface of the target object via the vacuum-gripping component.

10. The method of claim 9 wherein:
    the end-of-arm tool further includes:
        an actuator system operably coupled to the first clamping element and the second clamping element; and
        a sensor operably coupled to the actuator system to measure a current required to move the first clamping element and the second clamping element along the longitudinal axis; and
    generating the commands for grasping the target object further includes:
        generating commands to obtain, from the sensor, one or more signals related to the current required to move the first clamping element and the second clamping element along the longitudinal axis;
        generating commands to detect, based on the one or more signals, when the first clamping element and the second clamping element engage the sidewalls of the target object; and
        generating commands for stopping movement of the first clamping element and the second clamping element along the longitudinal axis.

11. The method of claim 8 wherein generating the commands for approaching the target object includes:
    determining, from the parameters of the target object, an initial width between the first clamping element and the second clamping element; and
    generating commands to move at least one of the first clamping element and the second clamping element along a longitudinal axis of the end-of-arm tool to position the first clamping element and the second clamping element at the initial width.

12. The method of claim 11 wherein the initial width is less than ten percent larger than one of the length of the target object or the width of the target object.

13. The method of claim 8 wherein generating the commands for releasing the target object in the placing location includes:
    identifying a trajectory from the placing location for the end-of-arm tool without impacting an environment around the placing location;
    generating commands for moving at least one of the first clamping element and the second clamping element along a longitudinal axis of the end-of-arm tool away from a sidewall of the target object;
    generating commands for disengaging an upper surface of the target object with the vacuum-gripping component; and
    generating commands for moving the end-of-arm tool along the identified trajectory.

14. The method of claim 8 wherein the parameters of the target object include a surface area of an upper surface of the target object, and wherein generating the commands for grasping the target object includes:
    identifying a subsection of the vacuum-gripping component corresponding to the upper surface after approaching the target object based on the surface area; and
    generating commands for operating the subsection of the vacuum-gripping component to apply a suction force to the upper surface.

15. A robotic system, comprising:
    a robotic arm; and
    an end effector operably coupled to the robotic arm, the end effector comprising:
        a housing having a lower surface;
        a suction-gripping component coupled to the lower surface of the housing, wherein the suction-gripping component includes:
            a first vacuum element operably coupled to a first side of the lower surface; and
            a second vacuum element coupled to a second side of the lower surface and spaced apart from the first vacuum element with a channel therebetween; and
        an object-clamping component, comprising:
            a first clamping portion projecting from the lower surface beyond the suction-gripping component;
            a second clamping portion projecting from the lower surface beyond the suction-gripping component, wherein the first clamping portion and second clamping portion are operably coupled to the housing through the channel between the first vacuum element and the second vacuum element; and
            an actuator system operably coupled to the first clamping portion to move the first clamping portion along a motion path parallel to a lateral axis of the housing.

16. The robotic system of claim 15 wherein the end effector further comprises one or more sensors operably coupled to the actuator system, and wherein the robotic system a controller operably coupled to the one or more sensors to:
  receive one or more sensor signals while the actuator system is moving the first clamping portion along the motion path;
  detect, based on the one or more sensor signals, when the object-clamping component engages side surfaces of a target object with a predetermined clamping force; and
  generate commands for the actuator system that cause the actuator system to stop moving the first clamping portion along the motion path.

17. The robotic system of claim 15 wherein the motion path is a first motion path, and wherein the actuator system is further operably coupled to the second clamping portion to move the second clamping portion along a second motion path parallel to the lateral axis of the housing.

18. The robotic system of claim 17 wherein, along the second motion path, the second clamping portion is movable between a first position spaced apart from a front edge of the housing and a second position at least partially aligned with the front edge of the housing.

* * * * *